United States Patent
Fukui et al.

(10) Patent No.: US 10,536,852 B2
(45) Date of Patent: Jan. 14, 2020

(54) ELECTRONIC APPARATUS, METHOD FOR AUTHENTICATING THE SAME, AND RECORDING MEDIUM

(71) Applicant: KYOCERA CORPORATION, Kyoto (JP)

(72) Inventors: Yujiro Fukui, Yokohama (JP); Keisuke Nagata, Kobe (JP)

(73) Assignee: KYOCERA CORPORATION, Kyoto (JP)

( * ) Notice: Subject to any disclaimer, the term of this patent is extended or adjusted under 35 U.S.C. 154(b) by 625 days.

(21) Appl. No.: 15/293,126

(22) Filed: Oct. 13, 2016

(65) Prior Publication Data

US 2017/0118642 A1 Apr. 27, 2017

(30) Foreign Application Priority Data

Oct. 27, 2015 (JP) .................................. 2015-210757

(51) Int. Cl.
*H04W 12/06* (2009.01)
*H04L 29/06* (2006.01)

(52) U.S. Cl.
CPC .......... *H04W 12/06* (2013.01); *H04L 63/083* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 9,558,336 B2* | 1/2017 | Lee | A61B 5/681 |
| 2009/0005652 A1* | 1/2009 | Kurtz | A61B 5/00 600/300 |
| 2009/0082831 A1* | 3/2009 | Paul | A61N 1/0456 607/59 |
| 2012/0019379 A1* | 1/2012 | Ben Ayed | G08B 13/1436 340/539.1 |
| 2012/0071149 A1* | 3/2012 | Bandyopadhyay | G06F 1/1643 455/418 |
| 2012/0133484 A1* | 5/2012 | Griffin | G06F 21/51 340/5.54 |
| 2013/0227651 A1* | 8/2013 | Schultz | G06F 21/32 726/4 |
| 2014/0282877 A1* | 9/2014 | Mahaffey | H04L 63/0853 726/3 |
| 2015/0059003 A1* | 2/2015 | Bouse | G06F 16/2228 726/28 |
| 2015/0070301 A1* | 3/2015 | Chia | G06K 9/00087 345/174 |
| 2015/0135310 A1* | 5/2015 | Lee | A61B 5/681 726/20 |

(Continued)

FOREIGN PATENT DOCUMENTS

| | | |
|---|---|---|
| JP | 2001-78966 | 3/2001 |
| JP | 2010-246148 A | 10/2010 |
| WO | WO 2009/093477 | 7/2009 |

*Primary Examiner* — Maung T Lwin
*Assistant Examiner* — Olanrewaju J Bucknor
(74) *Attorney, Agent, or Firm* — Duane Morris LLP

(57) ABSTRACT

A sleep detector is configured to detect sleep. At least one processor is configured to perform a first user authentication when the sleep detector does not detect the sleep, and perform a second user authentication when the sleep detector detects the sleep, the second user authentication being different from the first user authentication.

19 Claims, 18 Drawing Sheets

(56) References Cited

U.S. PATENT DOCUMENTS

| | | | | |
|---|---|---|---|---|
| 2015/0278498 | A1* | 10/2015 | Hong | G06F 21/32 |
| | | | | 340/5.82 |
| 2015/0379251 | A1* | 12/2015 | Komaki | G06F 21/32 |
| | | | | 726/19 |
| 2016/0092665 | A1* | 3/2016 | Cowan | G06F 21/35 |
| | | | | 726/9 |
| 2016/0170553 | A1* | 6/2016 | Hatanaka | G06F 3/0416 |
| | | | | 345/173 |
| 2017/0011210 | A1* | 1/2017 | Cheong | A61B 5/0022 |
| 2017/0220838 | A1* | 8/2017 | He | G06K 9/0004 |

* cited by examiner

F I G. 9
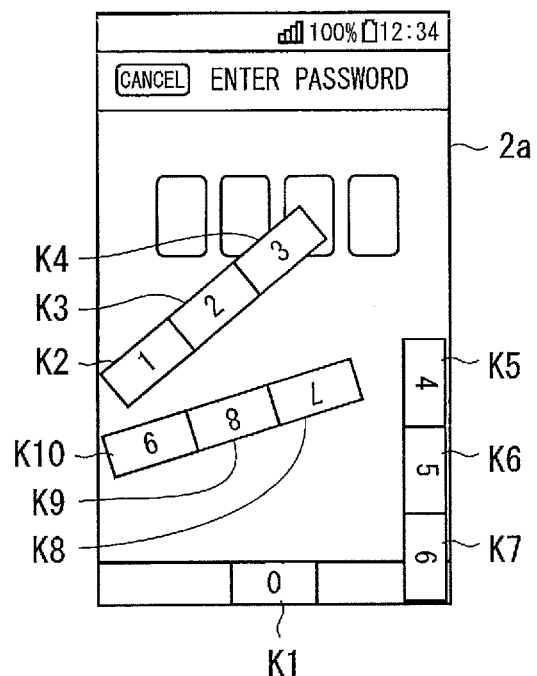
F I G. 10
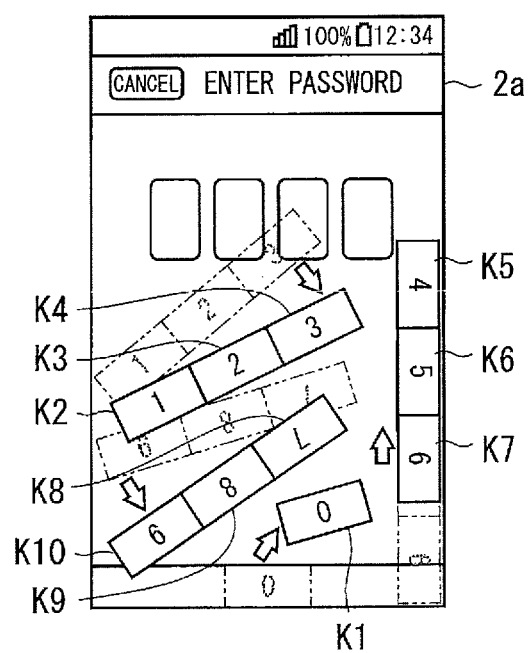

ELECTRONIC APPARATUS, METHOD FOR AUTHENTICATING THE SAME, AND RECORDING MEDIUM

CROSS-REFERENCE TO RELATED APPLICATION

The present application claims priority under 35 U.S.C. § 119 to Japanese Patent Application No. 2015-210757, filed on Oct. 27, 2015, entitled "ELECTRONIC APPARATUS, METHOD FOR AUTHENTICATING THE SAME, AND AUTHENTICATION PROGRAM". The content of which is incorporated by reference herein in its entirety.

FIELD

Embodiments of the present disclosure relate to an electronic apparatus, a method for authenticating the same, and a recording medium.

BACKGROUND

Various techniques on electronic apparatuses have conventionally been proposed.

SUMMARY

An electronic apparatus, a method for authenticating the same, and a recording medium are disclosed. In one embodiment, an electronic apparatus includes: a sleep detector and at least one processor. The sleep detector is configured to detect sleep. The at least one processor is configured to perform a first user authentication when the sleep detector does not detect the sleep, and perform a second user authentication when the sleep detector detects the sleep, the second user authentication being different from the first user authentication.

Furthermore, in one embodiment, the method for authenticating an electronic apparatus includes: determining Whether sleep is detected; and performing a first user authentication when the sleep is not detected, and performing a second user authentication when the sleep is detected, the second user authentication being different from the first user authentication.

In one embodiment, a control program is stored in a non-transitory computer-readable recording medium. The control program causes the electronic apparatus to execute the following first and second steps. The first step is a step of determining whether sleep is detected. The second step is a step of performing a first user authentication when the sleep is not detected, and performing a second user authentication when the sleep is detected, the second user authentication being different from the first user authentication.

BRIEF DESCRIPTION OF THE DRAWINGS

FIG. 9 schematically illustrates an example of an authentication screen.

FIG. 10 schematically illustrates an example of an authentication screen.

DETAILED DESCRIPTION

Embodiment 1

[Electronic Apparatus]

[External Appearance]

Figure 1:
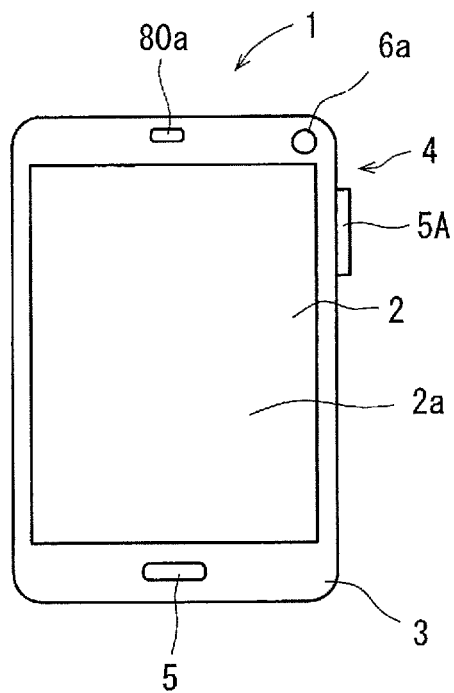
FIG. 1 illustrates a front view showing an example of an overview of an electronic apparatus.
Figure 2:
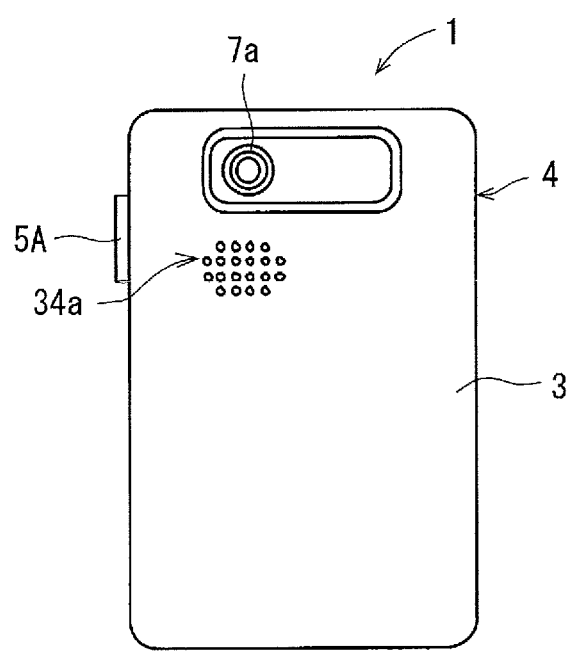
FIG. 2 illustrates a rear view showing an example of an overview of the electronic apparatus.

FIG. 1 illustrates an example of an overview of an electronic apparatus 1 when viewed from the front side. FIG. 2 illustrates a rear view showing an example of an overview of the electronic apparatus 1. Examples of the electronic apparatus 1 include a tablet, a personal digital assistant (PDA), a mobile phone such as a smartphone, and a mobile personal computer. Other possible examples of the electronic apparatus 1 include a camera, a wearable device (e.g., glasses, a watch, and a wristband), a health care product, an automobile-related product (e.g., a car navigation system), and a shaver.

In the examples of FIGS. 1 and 2, the electronic apparatus 1 includes a cover panel 2 and a case part 3. The combination of the cover panel 2 and the case part 3 comprises a case 4 forming an approximately rectangular plate in a plan view (hereinafter may be referred to as "apparatus case").

The cover panel 2 is approximately rectangular in a plan view, and is a portion other than the peripheral end in the front portion of the electronic apparatus 1. The cover panel 2 is formed of, for example, a transparent glass or a transparent acrylic resin. Alternatively, the cover panel 2 is made of, for example, sapphire. Sapphire is a single crystal mainly containing alumina ($Al_2O_3$), and is a single crystal whose purity of $Al_2O_3$ is approximately 90% or greater herein. The purity of $Al_2O_3$ is preferably greater than or equal to 99% to provide a greater resistance to damage of the cover panel 2.

The cover panel 2 may be a composite panel (laminated panel) with a multiple layer structure including a layer made of sapphire. For example, the cover panel 2 may be a composite panel with a two-layer structure of: a first layer made of sapphire and located on the surface of the electronic apparatus 1 (a sapphire panel); and a second layer made of glass and stuck on the first layer (a glass panel). Furthermore, the cover panel 2 may be a composite panel with a three-layer structure of: a first layer made of sapphire and located on the surface of the electronic apparatus 1 (a sapphire panel); a second layer made of glass and stuck on the first layer (a glass panel); and a third layer made of sapphire and stuck on the second layer (a sapphire panel). Furthermore, the cover panel 2 may comprise a layer made of one of crystalline materials other than sapphire, such as diamond, zirconia, titania, crystal, lithium tantalite, and aluminum oxynitride.

The case part 3 comprises the peripheral end in the front portion, the side portion, and the rear portion of the electronic apparatus 1. The case part 3 is made of, for example, a polycarbonate resin.

The front surface of the cover panel 2 comprises a display area 2a on which various pieces of information such as characters, symbols, figures, and images are displayed. The display area 2a is, for example, rectangular in a plan view. A peripheral end of the cover panel 2 that surrounds the display area 2a is opaque because of, for example, a film attached thereto, and is a non-display portion on which no information is displayed. A touch panel 52 to be described hereinafter is stuck on the rear surface of the cover panel 2. The user can provide various instructions to the electronic apparatus 1 by operating the display area 2a on the front surface of the electronic apparatus 1 using, for example, the finger. The user can provide the various instructions to the electronic apparatus 1 also by operating the display area 2a with an operator other than the finger, such as, pens for electrostatic touch panels including a stylus pen. The peripheral end that surrounds the display area 2a is not necessarily a non-display portion on which no information is displayed but may be, for example, a display area in which information different from that displayed in the display area 2a is displayed.

The apparatus case 4 comprises, for example, an operation key 5. The operation key 5 is, for example, a hardware key, and is located, for example, at the lower end on the front surface of the cover panel 2. In the examples of FIGS. 1 and 2, a power key 5A is also prepared as a sort of the operation key 5. The power key 5A is located on, for example, the side surface of the electronic apparatus 1.

The touch panel 52 and the operation key 5 (as well as the power key 5A which will be applied to the following) are examples of an input unit through which the user enters data into the electronic apparatus 1. Various inputs to be described hereinafter may be entered via the touch panel 52 or the operation key 5.

[Electrical Configuration]

Figure 3:
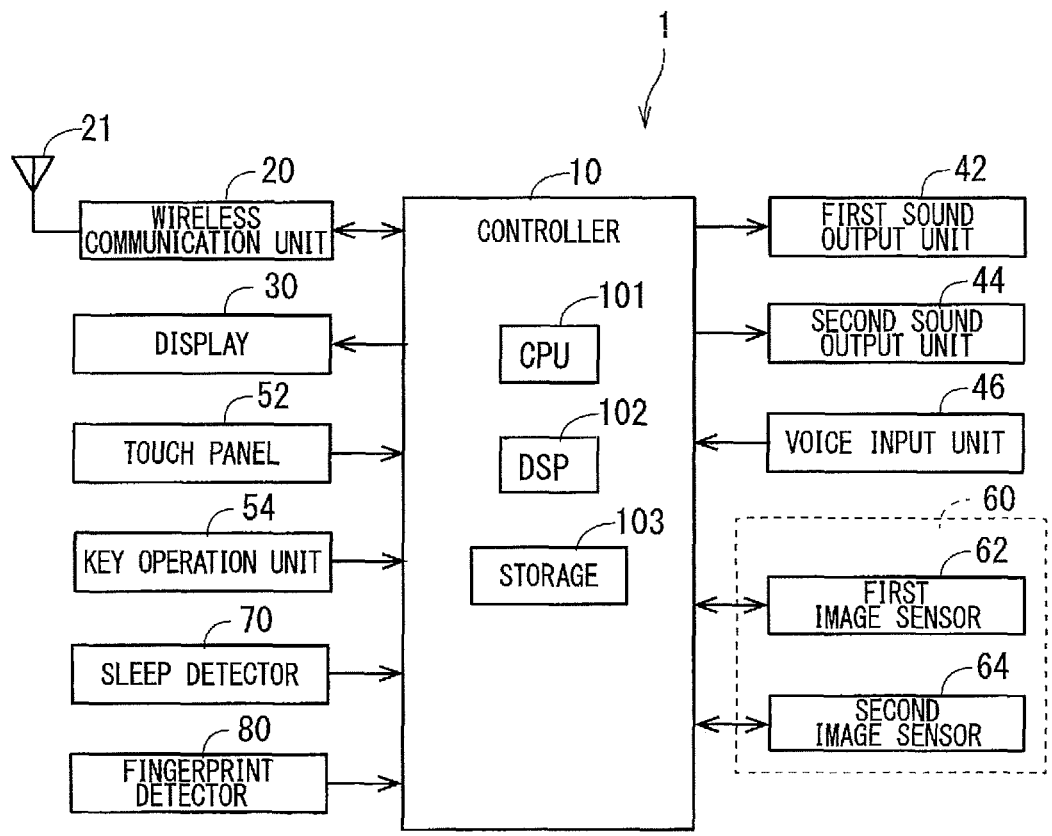
FIG. 3 schematically illustrates an example of an electrical configuration of the electronic apparatus.

FIG. 3 illustrates a block diagram showing an electrical configuration of the electronic apparatus 1. The electronic apparatus 1 in FIG. 3 includes, for example, a controller 10, a wireless communication unit 20, a display 30, a first sound output unit (herein a receiver) 42, a second sound output unit (herein a speaker) 44, a voice input unit 46, the touch panel 52, a key operation unit 54, an image sensor 60, a sleep detector 70, and a fingerprint detector 80. The apparatus case 4 accommodates these constituent elements of the electronic apparatus 1.

The controller 10 includes, for example, a central processing unit (CPU) 101, a digital signal processor (DSP) 102, and a storage 103. The controller 10 manages the overall operations of the electronic apparatus 1 by controlling the other constituent elements of the electronic apparatus 1. The storage 103 includes, for example, a read only memory (ROM) and a random access memory (RAM). The storage 103 stores, for example, (i) main programs that are control programs for controlling operations of the electronic apparatus 1, specifically, for controlling the respective constituent elements of the electronic apparatus 1 such as the wireless communication unit 20 and the display 30, and (ii) application programs (simply referred to as "applications" hereinafter). The CPU 101 and the DSP 102 execute various programs in the storage 103 to achieve various functions of the controller 10. Although FIG. 3 illustrates the one CPU 101 and the one DSP 102, the controller 10 may include CPUs 101 and DSPs 102. The CPU 101 and the DSP 102 may cooperate with each other to achieve the various functions. Furthermore, although the storage 103 is inside the controller 10 in FIG. 3, it may be placed outside of the controller 10. In other words, the storage 103 may be separated from the controller 10. Furthermore, a part or a whole of the functions of the controller 10 may be achieved by hardware.

The controller 10 may include at least one processor for providing control and processing capability to perforin various functions as described in further detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes. For example, the processor 10 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The wireless communication unit 20 includes an antenna 21. In the wireless communication unit 20, the antenna 21 can receive via, for example, a base station a signal from another electronic apparatus or a communication apparatus such as a web server connected to the Internet. The wireless communication unit 20 amplifies and down-converts a received signal, and outputs a resulting signal to the controller 10. The controller 10, for example, demodulates the received signal. Furthermore, the wireless communication unit 20 up-converts and amplifies a transmission signal generated by the controller 10, and wirelessly transmits the processed transmission signal from the antenna 21. The other electronic apparatus or the communication apparatus connected to the Internet receives the transmission signal from the antenna 21 via, for example, the base station.

The display 30 is, for example, a liquid crystal display panel or an organic electro luminescent (EL) panel. The display 30 can receive, for example, a display signal indicating a display screen from the controller 10, and can display the display signal. Specifically, the display 30 displays various pieces of information such as characters, symbols, figures, and images by control of the controller 10. The information displayed on the display 30 is displayed in the display area 2a on the front surface of the cover panel 2. Thus, the display 30 displays information in the display area 2a. The display area 2a has a strip shape with a longer side in a longitudinal direction.

The touch panel 52 is a detector that can detect an operation of an operator, such as the finger, in the display area 2a of the cover panel 2, and includes a touch sensor. The touch panel 52 is, for example, a projected capacitive touch detector, and is stuck on the rear surface of the cover panel 2. For example, when the user operates the display area 2a of the cover panel 2 using an operator, such as his/her finger, the touch panel 52 enters the corresponding signal into the controller 10. The controller 10 identifies details of the operation performed on the display area 2a, based on the signal from the touch panel 52, and performs a process corresponding to the identified details. The touch panel 52 may be a pressure-sensitive touch panel.

Since the touch panel 52 can detect an operation of the user in the display area 2a displayed by the display 30, the touch panel 52 and the display 30 may comprise an input unit by cooperating with each other. The touch panel 52 and the display 30 may be integrated into one. For example, a set of the touch panel 52 and the display 30 is formed by incorporating a touch sensor into each display element of a display panel. Examples implementing such a structure include an in-cell display and an on-cell display. Furthermore, irrespective of whether the touch panel 52 and the display 30 are integrated or separated, the set of these can be called a display with a touch sensor.

The key operation unit 54 can detect an operation of depressing the operation key 5 by the user. The key operation unit 54 determines whether the operation key 5 is depressed. When the operation key 5 is not depressed, the key operation unit 54 outputs, to the controller 10, a non-operated signal indicating that the operation key 5 is not operated. Furthermore, when the operation key 5 is depressed, the key operation unit 54 outputs, to the controller 10, an operation signal indicating that the operation key 5 is operated. Accordingly, the controller 10 can determine whether the operation key 5 is operated.

Each of the touch panel 52 and the operation key 5 functions as an input unit to the electronic apparatus 1. Any input using the touch panel 52, which will be described later, can be assigned to the operation key 5.

In various embodiments, the input unit may be implemented using any input technology or device known in the art such as, for example, a QWERTY keyboard, a pointing device (e.g., a mouse), a joy stick, a stylus, a touch screen display panel, a key pad, one or more buttons, etc., or any combination of these technologies.

The first sound output unit (for example, the receiver) 42 can output received sound, and is, for example, a dynamic speaker. The first sound output unit 42 can convert an electric sound signal from the controller 10 into a sound, and then output the sound. The first sound output unit 42 can output the sound from a receiver hole 80a located on the front surface of the electronic apparatus 1, to the outside. The volume of the sound output from the receiver hole 80a is smaller than the volume of the sound output from the second sound output unit 44 through speaker holes 34a.

The first sound output unit 42 may be replaced with a piezoelectric vibrator. The piezoelectric vibrator is controlled by the controller 10, and vibrates based on a voice signal. The piezoelectric vibrator is located, for example, on the rear surface of the cover panel 2, and vibrates the cover panel 2 with the own vibration based on the voice signal. Accordingly, the vibration of the cover panel 2 is transmitted to the ears of the user as voice. Here, the receiver hole 80a is unnecessary.

The second sound output unit (for example, a speaker) 44 is, for example, a dynamic speaker, and can convert an electric sound signal from the controller 10 into a sound, and then outputs the sound. The second sound output unit 44 can output the sound from the speaker holes 34a located on the rear surface of the electronic apparatus 1, to the outside. The volume of the sound output from the speaker holes 34a is adjusted to be heard at a location distant from the electronic apparatus 1. In other words, the volume of the second sound output unit (speaker) 44 is larger than that of the first sound output unit (receiver or piezoelectric vibrator) 42.

The voice input unit 46 is, for example, a microphone, and can convert the voice entered from outside of the electronic apparatus 1 into an electric sound signal and outputs the electric sound signal to the controller 10. The voice input unit 46 can receive the voice from the outside of the electronic apparatus 1 into the electronic apparatus 1 through a microphone hole located on the front surface of the cover panel 2.

The image sensor 60 includes, for example, a first image sensor 62 and a second image sensor 64. The first image sensor 62 includes, for example, an imaging lens 6a and an imaging sensor, and can capture a still image and a moving image based on the control by the controller 10. As illustrated in FIG. 1, the imaging lens 6a located on the front surface of the electronic apparatus 1 can image an object in front of the electronic apparatus 1 (toward the cover panel 2).

The second image sensor 64 includes, for example, an imaging lens 7a and an imaging sensor, and can capture a still image and a moving image based on the control by the controller 10. As illustrated in FIG. 2, the imaging lens 7a located on the rear surface of the electronic apparatus 1 can image an object in the rear of the electronic apparatus 1.

The sleep detector 70 can detect sleep of the user. Any method will do as a method for detecting sleep. The specific examples thereof will be described below.

The sleep detector 70 may detect sleep of the user when detecting, for example, a snoring sound or a grinding sound. Here, the sleep detector 70 may include the voice input unit 46. For example, the sleep detector 70 determines whether a sound signal entered from the voice input unit 46 resembles a sound signal indicating the snoring sound or the grinding sound that is stored in a storage (for example, the storage 103 which will be applied to the following), and detects sleep when these sound signals resemble each other. The determination can be made using any method. The sleep detector 70 may determine that these sound signals resemble each other, for example, when an integral of a difference, during a predetermined time, between the sound signal entered from the voice input unit 46 and the stored sound signal indicating the snoring sound or the grinding sound is smaller than a sound reference value.

Alternatively, the sleep detector 70 may include an activity sensor. This activity sensor, for example, worn on the user can monitor an activity of the user. The activity sensor may be, for example, worn around the wrist of the user. The activity sensor includes, for example, an acceleration detector. The acceleration detector can measure an acceleration of the activity sensor. When the user moves a portion on which the activity sensor is worn, the acceleration corresponding to the movement occurs in the activity sensor. The sleep detector 70 may detect sleep when a variation in the measured acceleration is smaller than an acceleration reference value over a predetermined time period. Specifically, the sleep detector 70 detects sleep when the movement of the user is smaller.

When the sleep detector 70 is wearable, the sleep detector 70 has a function of communicating with the electronic apparatus 1. The sleep detector 70 can, for example, wirelessly inform the electronic apparatus 1 of detection of sleep.

Alternatively, the electronic apparatus 1 may have a part of the functions of the sleep detector 70. Suppose, for example, a wearable device installs the activity sensor and a communication unit. The communication unit transmits a value (for example, acceleration) measured by the activity sensor to the electronic apparatus 1. The controller 10 may determine whether the user is sleeping, based on the measured value. Since the sleep detector 70 reads biometric information of the user who wears the sleep detector 70, which will be described later, it also detects sleep. Thus, the description will not be repeated.

The activity sensor may include a heart rate sensor. The heart rate sensor can measure the heart rate of the user. The heart rate sensor includes, for example, a light source and a photodetector. The light source emits light to the skin of the user, and the photodetector receives the reflected light. Since the reflected light varies according to a variation in the blood flow, the heart rate sensor can measure the pulse rate based on a variation in the reflected light. Since a heart rate during sleep differs from the one during wakefulness, sleep can be detected based on the heart rate. The sleep detector 70 may detect sleep when, for example, the heart rate is lower than a heart rate reference value over a predetermined time period.

Alternatively, the activity sensor may include a temperature sensor. The temperature sensor can measure the body temperature of the user. Since a body temperature during sleep differs from the one during wakefulness, sleep can be detected based on the body temperature. The sleep detector 70 may detect sleep when, for example, the measured body temperature is lower than a body temperature during wakefulness by a body temperature reference value or more. The user may, for example, preset the body temperature during wakefulness.

Sleep may be detected using at least two of the acceleration, the heart rate, and the body temperature. Sleep may be detected, for example, when the acceleration and the heart rate are lower than the respective reference values over a predetermined time period.

The sleep detector 70 may detect sleep based on brain waves of the user. The sleep detector 70 includes a brain waves sensor to be placed on the user. The brain waves sensor can measure the brain waves of the user. The brain waves sensor includes, for example, electrodes placed on or proximate to the head of the user. The brain waves sensor measures the brain waves based on change in electrical potential at the electrodes. The brain waves during sleep differ from the ones during wakefulness. The time variations in the brain waves have characteristics according to the depth of sleep. The sleep detector 70 measures the brain waves of the user, and detects sleep when the brain waves represent sleep. The sleep detector 70 may detect sleep, for example, when the measured brain waves resemble brain waves during sleep that are accumulated in the storage.

Alternatively, the sleep detector 70 may detect sleep based on the respiration of the user as described in, for example, WO2009/093477. The sleep detector 70 includes, for example, a body motion sensor. This body motion sensor is worn on, for example, the chest of the user, and can monitor a motion of the user according to his/her respiratory motion. Since the respiration during sleep differs from the one during wakefulness, sleep can be detected based on the monitored respiration. Since the cycle of the respiration is substantially constant during sleep, the sleep may be detected when a variation in cycle of the respiration falls within a predetermined range.

Alternatively, the sleep detector 70 may detect sleep based on an amount of perspiration as described in, for example, Japanese Unexamined Patent Application Publication No. 2001-78966. Generally speaking, the humidity proximate to a human body suddenly increases when the sleep is deepened. After the amount of perspiration reaches its maximum value, it decreases during REM sleep, and increases during non-REM sleep. Thus, sleep may be detected when increase in the amount of perspiration or alternately increasing and decreasing the amount of perspiration is detected.

The amount of perspiration can be determined based on a difference between the humidity proximate to the user and an ambient humidity. Thus, the sleep detector 70 includes, for example, a first humidity detector worn on the user, and a second humidity detector included in the electronic apparatus 1. When the amount of perspiration increases, since an ambient humidity measured distant from the user rarely changes while the humidity proximate to the user increases, the amount of perspiration is reflected by a difference between a first humidity measured by the first humidity detector and a second humidity measured by the second humidity detector. Conversely, the amount of perspiration can be estimated based on the difference between the first humidity and the second humidity. The sleep detector 70 also includes a communication unit that informs the electronic apparatus 1 of the first humidity measured by the first humidity detector. The controller 10 may estimate the amount of perspiration based on the difference between the first humidity and the second humidity, and detect sleep according to time variations in the amount of perspiration.

As described above, the sleep detector 70 can detect sleep of the user.

The fingerprint detector 80 can detect a fingerprint of a finger that is in contact with the electronic apparatus 1. A fingerprint detection region may be any portion of the electronic apparatus 1. The fingerprint detector 80 may detect, for example, a fingerprint of a finger that is in contact with the operation key 5. Furthermore, the fingerprint detector 80 may detect a fingerprint of a finger that is in contact with an operation key 5A. When the operation key 5A is located on the side surface of the case part 3, the operation key 5A may protrude from the side surface of the case part 3 as illustrated in FIG. 1, may be flush with the side surface of the case part 3 without protruding from the side surface, or may be located inside the case part 3 with respect to the side surface.

Specifically, the fingerprint detector 80 detects a fingerprint of a finger that is in contact with a portion of the operation key 5 that is exposed from the apparatus case 4. The fingerprint detector 80 can detect a fingerprint of a finger that is static while being in contact with the operation key 5. A portion of the operation key 5 that is exposed from the apparatus case 4 is a fingerprint detection region. The fingerprint detector 80 may detect a fingerprint of a finger that, for example, is static while being in contact with the display area 2a. The fingerprint detector 80 outputs, for example, a fingerprint image of the detected fingerprint as a result of the fingerprint detection. The detection method performed by the fingerprint detector 80 is, for example, a capacitive sensing method. The detection method performed by the fingerprint detector 80 may be a method other than the capacitive sensing method, for example, an optical method.

The controller 10 perform as a user authentication, based on a result of the fingerprint detection performed by the fingerprint detector 80.

[Controller]

Figure 4:
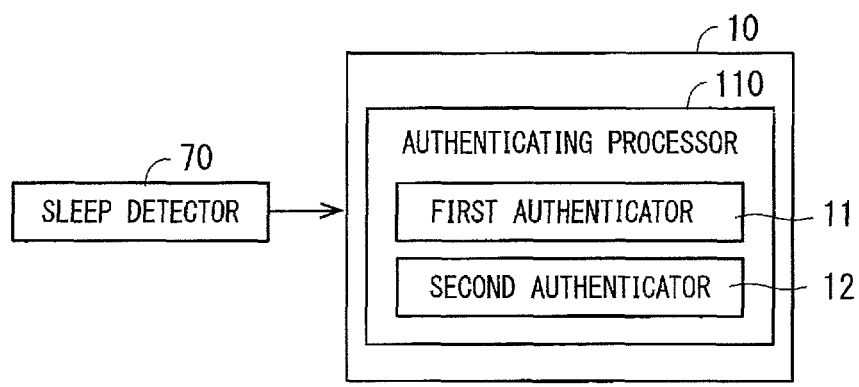
FIG. 4 schematically illustrates an example of a configuration of a controller.

FIG. 4 schematically illustrates an example of a configuration of the controller 10. The controller 10 includes an authenticating processor 110. This authenticating processor 110 may be implemented by executing an authenticating program stored in the storage 103, or configured by hardware. The authenticating processor 110 includes a first authenticator 11 and a second authenticator 12.

The controller 10 can set a lock mode. In the lock mode, an input to the electronic apparatus 1 is restricted. Thus, unless the user cancels the lock mode, the functions of the electronic apparatus 1 cannot be fully used. This lock mode is cancelled when the user authentication to be described hereinafter has been successful. Accordingly, the user can fully use the functions of the electronic apparatus 1.

In the authenticating processor 110, the first authenticator 11 performs a first user authentication when the sleep detector 70 does not detect sleep, and the second authenticator 12 performs a second user authentication when the sleep detector 70 detects sleep. The user authentication will be simply referred to as "authentication" hereinafter.

The first authenticator 11 performs the first authentication. The first authentication may be, but not limited to, for example, a fingerprint authentication. The first authenticator 11 determines whether the fingerprint detected by the fingerprint detector 80 (hereinafter also referred to as detected fingerprint) resembles a fingerprint stored in the storage (hereinafter also referred to as registered fingerprint). The first authenticator 11 determines that the first authentication has been successful when determining that these fingerprints resemble each other, and determines that the first authentication has failed when determining that these fingerprints do not resemble each other. Any methods may be used to determine whether these fingerprints resemble each other. The first authenticator 11 may determine that these fingerprints resemble each other when, for example, a sum of differences between pixels of an image of a detected fingerprint and pixels of an image of a registered fingerprint is smaller than a fingerprint reference value.

The second authenticator 12 performs the second authentication. The second authentication is different from the first authentication. The second authentication may be, for example, a fingerprint authentication using a second registered fingerprint different from the first registered fingerprint used in the first authentication. Here, the first authentication and the second authentication differ from each other in registered fingerprint.

Furthermore, the authenticating processor 110 can generate a registered fingerprint. The authenticating processor 110, for example, notifies the user so that the finger of the user should be in contact with the fingerprint detector 80. This notification may be performed by, for example, displaying the details on the display 30. When the user brings a predetermined first finger in contact with the fingerprint detector 80, the fingerprint detector 80 detects a fingerprint of the first finger, and outputs it to the authenticating processor 110. The authenticating processor 110 stores, in the storage, this fingerprint as the first registered fingerprint to be used in the first authentication. Next, the authenticating processor 110 notifies the user so that another finger of the user should be in contact with the fingerprint detector 80. When the user brings a predetermined second finger in contact with the fingerprint detector 80, the fingerprint detector 80 detects a fingerprint of the second finger, and outputs it to the authenticating processor 110. The authenticating processor 110 stores, in the storage, this fingerprint as the second registered fingerprint to be used in the second authentication.

Accordingly, the user can use a fingerprint of the first finger (for example, a forefinger) as the first registered fingerprint to be used in the first authentication, and a fingerprint of the second finger (for example, a middle finger) that is different from the first fingerprint, as the second registered fingerprint to be used in the second authentication.

Figure 5:
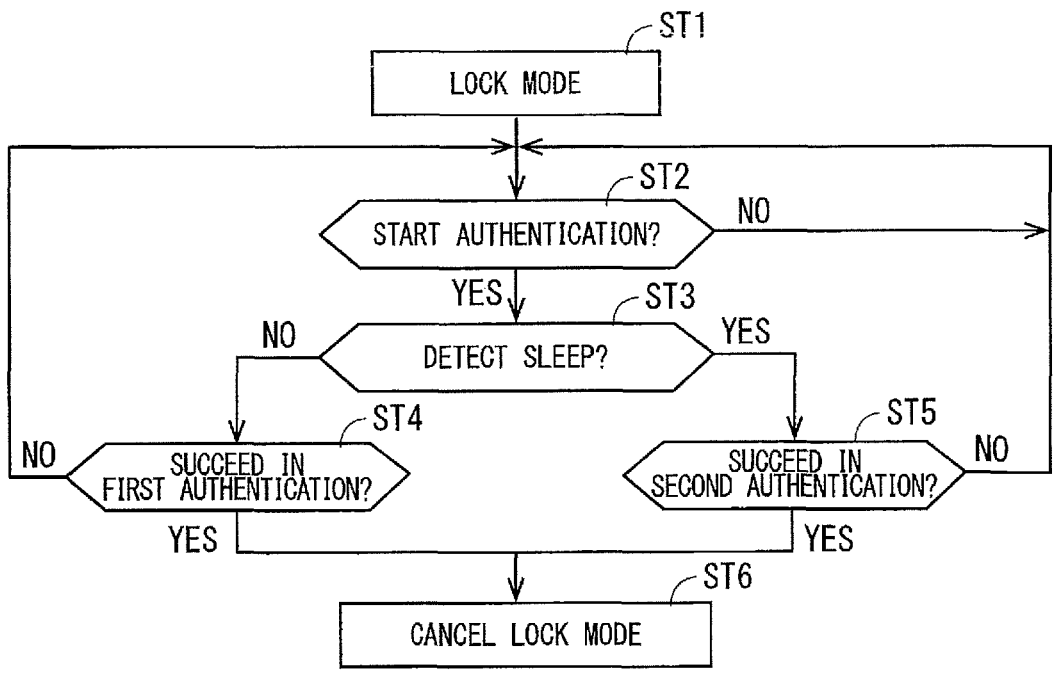
FIG. 5 illustrates a flowchart showing an example of specific operations performed by the controller.

FIG. 5 illustrates a flowchart showing an example of the authentication operations performed by the controller 10. At a step ST1, the controller 10 sets the lock mode. Accordingly, an input to the electronic apparatus 1 is restricted. Next at a step ST2, the authenticating processor 110 determines whether the user entered a start trigger that starts authentication. For example, in a fingerprint authentication, the authenticating processor 110 can use detection of a fingerprint by the fingerprint detector 80 as a start trigger. Specifically, with the finger of the user in contact with, for example, the operation key 5, the fingerprint detector 80 detects a fingerprint of the finger, and outputs it to the authenticating processor 110. The authenticating processor 110 determines the input of the detected fingerprint as the start trigger.

When the authenticating processor 110 determines that a start trigger has not been entered yet, the step ST2 is again performed. When determining that a start trigger has been entered, the authenticating processor 110 determines whether the sleep detector 70 has detected sleep at a step ST3. This determination is made when the authenticating processor 110 receives a result of the detection by the sleep detector 70. When determining that the sleep detector 70 does not detect sleep, the first authenticator 11 of the authenticating processor 110 determines whether it has succeeded in the first authentication at a step ST4. The first authenticator 11, for example, determines whether the detected fingerprint resembles the first registered fingerprint. When determining that the detected fingerprint does not resemble the first registered fingerprint, the first authenticator 11 determines that the first authentication has failed, and performs the step ST2 again. Specifically, when the first authentication has failed, the step ST2 is performed again without canceling the lock mode.

When determining that the detected fingerprint resembles the first registered fingerprint, the first authenticator 11 determines that the first authentication has been successful, and the controller 10 cancels the lock mode at a step ST6. Accordingly, for example, all of the inputs to the electronic apparatus 1 are validated.

When determining that sleep has been detected at the step ST3, the second authenticator 12 of the authenticating processor 110 determines whether it has succeeded in the second authentication at a step ST5. The second authenticator 12, for example, determines whether the detected fingerprint resembles the second registered fingerprint. When determining that the detected fingerprint does not resemble the second registered fingerprint, the second authenticator 12 determines that the second authentication has failed, and performs the step ST2 again. Specifically, when the second authentication has failed, the step ST2 is performed again without canceling the lock mode.

When determining that the detected fingerprint resembles the second registered fingerprint, the second authenticator 12 determines that the second authentication has been successful, and the controller 10 cancels the lock mode at the step ST6. Accordingly, for example, all of the inputs to the electronic apparatus 1 are validated.

As described above, the first authentication is performed when sleep is not detected and the second authentication different from the first authentication is performed when sleep is detected, in the authentication method of the present disclosure. Accordingly, a new user authentication function can be provided.

Unlike the above examples, performing the same authentication irrespective of the presence or absence of detection of sleep will be described hereinafter. The authentication is made successful by operating the electronic apparatus 1, for example, while the user is awake. Here, the third party sometimes watches operation details of the authentication. The third party may watch, for example, a state where the user performs a fingerprint authentication using a fingerprint of the first finger (for example, the forefinger). When the third party operates the electronic apparatus 1 with the same motion as the obtained motion while the user is sleeping, the lock mode is canceled. Then, the third party can use the electronic apparatus 1. The lock mode can be canceled, for example, when the third party places the first finger of the user in contact with the operation key 5.

Thus, according to Embodiment 1, the second authentication different from the first authentication is performed when sleep is detected. Thus, even when the third party appropriately performs operations for the first authentication while the user is sleeping, the second authentication fails. Even when, for example, the third party places the first finger of the user who is sleeping, in contact with the operation key 5, the second authentication fails and the lock mode is not canceled. Thus, it is possible to restrain the third party from illegitimately using the electronic apparatus 1.

In particular, the third party easily recognizes which finger the user uses to perform a fingerprint authentication. Thus, this authentication method easily produces the advantages when a fingerprint authentication is used as the first authentication.

[Another First Specific Example of Fingerprint Authentication Performed by Second Authenticator]

When sleep is detected, the second authenticator 12 may perform a fingerprint authentication using a set of fingerprints of the fingers. This is because in a fingerprint authentication using one finger, the third party sooner or later can successfully perform the second authentication using each of the fingers of the user during sleep. Thus, the second authentication can be made more difficult by performing a fingerprint authentication using a set of fingerprints of the fingers. This can further restrain the third party from illegitimately using the electronic apparatus 1 while the user is sleeping.

Figure 6:
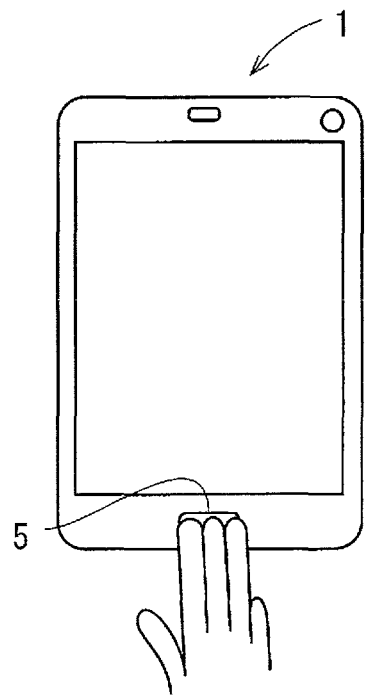
FIG. 6 illustrates an example of performing a fingerprint authentication.

FIG. 6 illustrates an example of performing a fingerprint authentication using a set of the fingers. In the example of FIG. 6, the forefinger, the middle finger, and the ring finger of the right hand are simultaneously in contact with the operation key 5.

In performing such a fingerprint authentication, the fingerprints of a set of the fingers need to be stored in the storage as second registered fingerprints. Here, the authenticating processor 110 may notify the user so that the fingers of the user should be in contact with the operation key 5 when the second registered fingerprints are registered. When the user brings a set of the fingers in contact with the operation key 5, the fingerprint detector 80 detects the fingerprints of the set of the fingers, and outputs the fingerprints to the authenticating processor 110. The authenticating processor 110 stores, in the storage, the fingerprints as the second registered fingerprints. Accordingly, a fingerprint authentication is performed using a set of the fingers in the second authentication.

[Another Second Specific Example of Fingerprint Authentication Performed by Second Authenticator]

The second authenticator 12 may determine that the second authentication has been successful, when fingerprint authentications using the second registered fingerprints are performed in a predetermined order and all of the fingerprint authentications are successfully performed. These operations can make it difficult to perform the second authentication while the user is sleeping.

Figure 7:
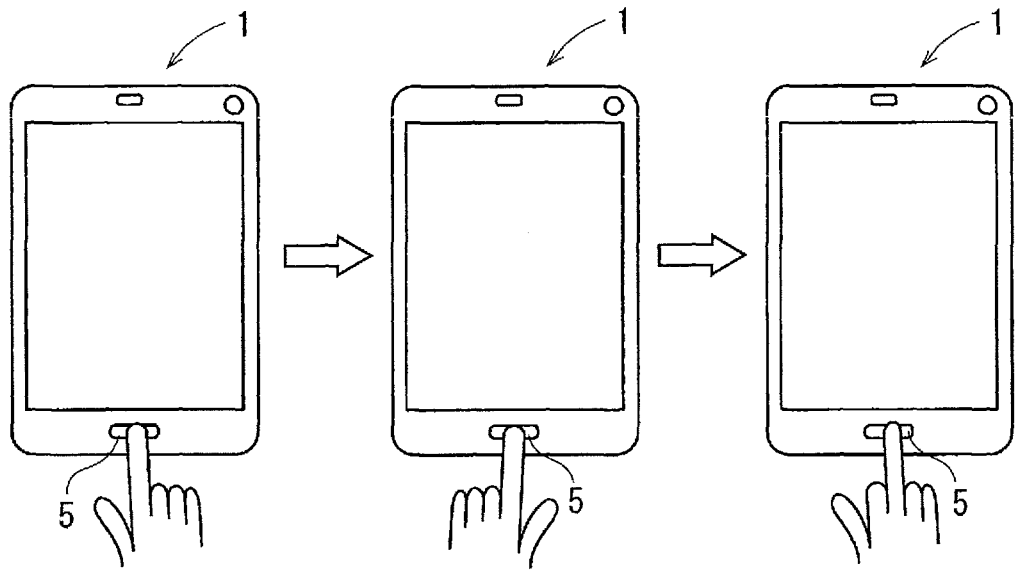
FIG. 7 illustrates an example of performing a fingerprint authentication.

The fingerprints of different fingers can be used as the second registered fingerprints. Three second registered fingerprints F1 to F3 are used as the examples. The second registered fingerprints F1, F2, and F3 are the forefinger of the right hand, the forefinger of the left hand, and the middle finger of the right hand, respectively. For the successful second authentication, the forefinger of the right hand, the forefinger of the left hand, and the middle finger of the right hand need to be in contact with the fingerprint detector 80 in this order. In other words, the second authentication is made successful when the fingerprint first detected resembles the second registered fingerprint F1, and the fingerprint subsequently detected resembles the second registered fingerprint F2, and the fingerprint finally detected resembles the second registered fingerprint F3. FIG. 7 schematically illustrates an example of performing the second authentication. In the example of FIG. 7, the forefinger of the right hand, the forefinger of the left hand, and the middle finger of the right hand are made in contact with the operation key 5 in this order.

Figure 8:
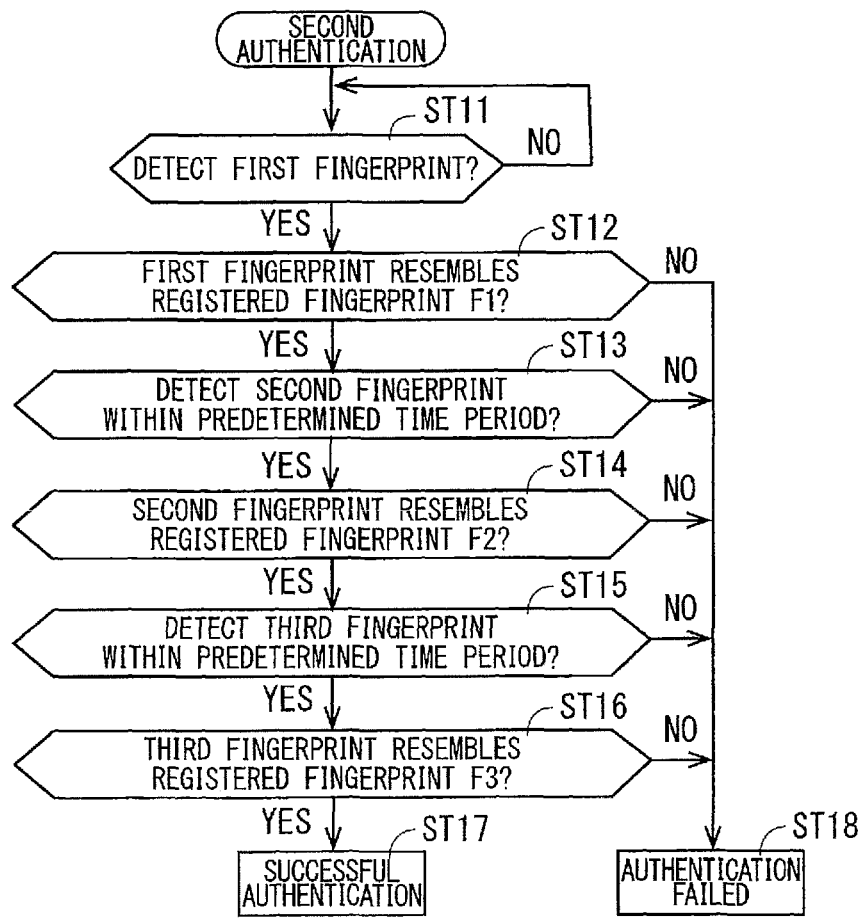
FIG. 8 illustrates a flowchart showing an example of specific operations performed by the controller.

FIG. 8 illustrates a flowchart showing an example of the operations performed by the second authenticator 12. First, the second authenticator 12 determines whether the fingerprint detector 80 has detected a fingerprint (first fingerprint) at a step ST11. When the second authenticator 12 determines that the fingerprint detector 80 does not detect the first fingerprint, the step ST11 is again performed. When determining that the fingerprint detector 80 has detected the first fingerprint, the second authenticator 12 determines whether the first fingerprint resembles the second registered fingerprint F1 at a step ST12. When determining that the first fingerprint does not resemble the second registered fingerprint F1, the second authenticator 12 determines that the authentication has failed at a step ST18.

When determining that the first fingerprint resembles the second registered fingerprint F1, at a step ST13, the second authenticator 12 determines whether the fingerprint detector 80 has detected the next fingerprint (second fingerprint) within a predetermined time period. When determining that the fingerprint detector 80 does not detect the second fingerprint within the predetermined time period, the second authenticator 12 determines that the authentication has failed at the step ST18. In other words, the second authenticator 12 determines the user who does not bring his/her finger proximate to the operation key 5 within the predetermined time period to be an illegitimate third party.

When determining that the fingerprint detector 80 has detected the second fingerprint within the predetermined time period, the second authenticator 12 determines whether the second fingerprint resembles the second registered fingerprint F2 at a step ST14. When determining that the second fingerprint does not resemble the second registered fingerprint F2, the second authenticator 12 determines that the authentication has failed at the step ST18.

When determining that the second fingerprint resembles the second registered fingerprint F2, the second authenticator 12 determines whether the fingerprint detector 80 has detected the next fingerprint (third fingerprint) within a predetermined time period at a step ST15. When determining that the fingerprint detector 80 does not detect the third fingerprint, the second authenticator 12 determines that the authentication has failed at the step ST18.

When determining that the fingerprint detector 80 has detected the third fingerprint within the predetermined time period, the second authenticator 12 determines whether the third fingerprint resembles the second registered fingerprint F3 at a step ST16. When determining that the third fingerprint does not resemble the second registered fingerprint F3, the second authenticator 12 determines that the authentication has failed at the step ST18.

When determining that the third fingerprint resembles the second registered fingerprint F3, the second authenticator 12 determines that the authentication has been successful at a step ST17. In other words, the second authenticator 12 determines that the second authentication has been successful when all of the first to third fingerprints are authenticated.

As described above, this second authentication requires the fingers to be brought proximate to the operation key 5 (fingerprint detector 80) in a predetermined order. Thus, the third party hardly succeeds in the second authentication. Thus, it is possible to further restrain the third party from illegitimately using the electronic apparatus 1 while the user is sleeping.

Embodiment 2

In Embodiment 1, a fingerprint authentication is used as the second authentication. In Embodiment 2, a password authentication is used instead.

The second authenticator 12 causes the display 30 to display an authentication screen. FIGS. 9 and 10 each schematically illustrate an example of an authentication screen. In each of the examples of FIGS. 9 and 10, elements K1 to K10 are displayed in the authentication screen as buttons for entering a password. As an example herein, the password is a series of numbers, and the elements K1 to K10 function as buttons for entering the numbers 0 to 9, respectively. The corresponding numbers are attached to the elements K1 to K10.

The password is not necessarily limited to a series of numbers but can be any text (numbers, characters, or symbols). Here, the elements that function as buttons for entering the text are displayed in the authentication screen.

The second authenticator 12 moves the elements K1 to K10 with the passage of time, and concurrently causes the display 30 to display the elements. In other words, the second authenticator 12 changes the display positions of the elements K1 to K10 with the passage of time, for example, continuously. FIG. 9 illustrates an authentication screen at a first time point, and FIG. 10 illustrates an authentication screen at a second time point subsequent to the first time point. In the example of FIG. 10, each of the elements K1 to K10 in FIG. 9 is illustrated by chain double-dashed lines. Furthermore, the elements K2 to K4 are moved as a group, the elements K5 to K7 are moved as a group, and the elements K8 to K10 are moved as a group in the examples of FIGS. 9 and 10. In the example of FIG. 10, the moving directions of the element K1 and the groups are illustrated by block arrows.

The touch panel 52 detects an operation on each of the elements K1 to K10, and outputs it to the second authenticator 12. The user sequentially operates the elements K1 to K10 as necessary, so that the password enters the second authenticator 12. The second authenticator 12 determines whether the entered password is valid. The valid password should be preset and stored in the storage. The second authenticator 12 determines that the second authentication has been successful when the password is valid, and determines that the second authentication has failed when the password is invalid.

As described above, the display positions of the elements K1 to K10 are changed with the passage of time, in the second authentication to be executed while the user is sleeping. Such operations make it difficult to enter a password and consequently to succeed in the second authentication. Thus, it is possible to further restrain the third party from illegitimately using the electronic apparatus 1 while the user is sleeping. Furthermore, even when the user attempts to operate the electronic apparatus 1, for example, in a half asleep state, the operations above also make it difficult to enter a password and succeed in the second authentication. While the user is not fully awake, he/she easily performs an operating error. Here, even when the user in an inadequate state (in a not-fully-awake state) attempts to operate the electronic apparatus 1, the user hardly succeeds in the second authentication and such an operating error can be reduced.

Furthermore, each of the elements K1 to K10 is moved while being rotated as appropriate in the examples of FIGS. 9 and 10. Accordingly, the numbers attached to the elements K1 to K10 are also rotated. Accordingly, the user has trouble reading the numbers attached to the elements K1 to K10. This operation further makes it difficult to enter a password.

Furthermore, a fingerprint authentication function may be installed near the elements K1 to K10 displayed in the display area 2a of FIGS. 9 and 10. The fingerprint detector 80 may detect, for example a fingerprint of a finger that is in contact with a portion of the display area 2a where the elements K1 to K10 can be moved. Furthermore, the fingerprint detector 80 may detect a fingerprint of a finger that is in contact with the display area 2a. Accordingly, it is necessary to enter a password using a finger of the user. Thus, for example, it is possible to restrain the third party from illegitimately using the electronic apparatus 1. Furthermore, as described above, it is possible to restrain the user in an inadequate state from operating the electronic apparatus 1.

[First Authentication]

Although a fingerprint authentication is performed as the first authentication in Embodiment 1, a password authentication may be used together with the fingerprint authentication or as a replacement for the fingerprint authentication.

Figure 11:
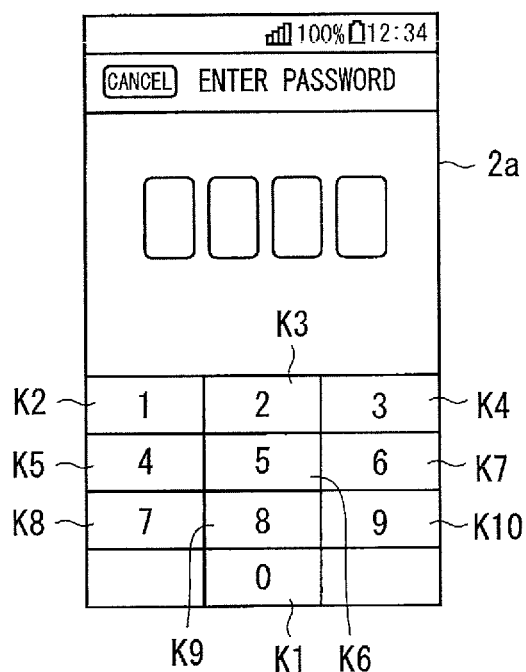
FIG. 11 schematically illustrates an example of an authentication screen.

The first authenticator 11 may cause the display 30 to display an authentication screen for a password, for example, after the fingerprint authentication is made successful. FIG. 11 schematically illustrates an example of this authentication screen. The authentication screen has the elements K1 to K10 that function as buttons for entering the password. These elements K1 to K10 may be displayed in respective predetermined positions, irrespective of the passage of time.

The touch panel 52 detects an operation on each of the elements K1 to K10, and outputs it to the first authenticator 11. The user operates the elements K1 to K10 as necessary, so that the password enters the first authenticator 11. The first authenticator 11 determines whether the entered password is valid. The first authenticator 11 determines that the first authentication has been successful when the password is valid, and determines that the first authentication has failed when the password is invalid.

[Second Authentication]

When a password authentication is used in the first and second authentications, for example, the valid password for the first authentication may be different from that for the second authentication. Accordingly, even when the third party visually identifies the operation of the authorized user and illegitimately obtains the password for the first authentication, the second authentication fails with the password while the user is sleeping. Thus, it is possible to restrain the third party from illegitimately using the electronic apparatus 1. Here, the first authentication and the second authentication differ from each other in valid password.

[Operation on Element for Entering Password]

The operations on the elements K1 to K10 in the second authentication may differ from those in the first authentication. For example, tapping can be used for operating the elements K1 to K10 in the first authentication. The tapping is an operation of placing an operator proximate to the display area 2a and then moving the operator away from the display area 2a within a first predetermined time period after the proximity. The placing the operator proximate herein includes states where the operator is in contact with the display area 2a and is slightly distant from the display area 2a.

On the other hand, the elements K1 to K10 in the second authentication can be operated by operations other than the tapping. Examples of the operations include long tapping and double tapping. The long tapping is an operation of maintaining an operator proximate to the display area 2a for more than the first predetermined time period and then moving the operator away from the display area 2a. The double tapping is an operation of successively tapping a screen twice.

Accordingly, even when the third party visually identifies the operation of the user and recognizes a method for operating each of the elements K1 to K10 in the first authentication, the third party cannot operate the elements K1 to K10 in the method while the user is sleeping. In other words, the third party cannot enter even a password in the operating method. Thus, the third party hardly succeeds in the second authentication. Thus, it is possible to further restrain the third party from illegitimately using the electronic apparatus 1 while the user is sleeping.

Furthermore, the operations on the elements K1 to K10 in the second authentication include sliding from a corresponding one of the elements K1 to K10 to a predetermined position. The sliding is an operation of moving an operator parallel to the display area 2a with the operator proximate to the display area 2a.

Figure 12:
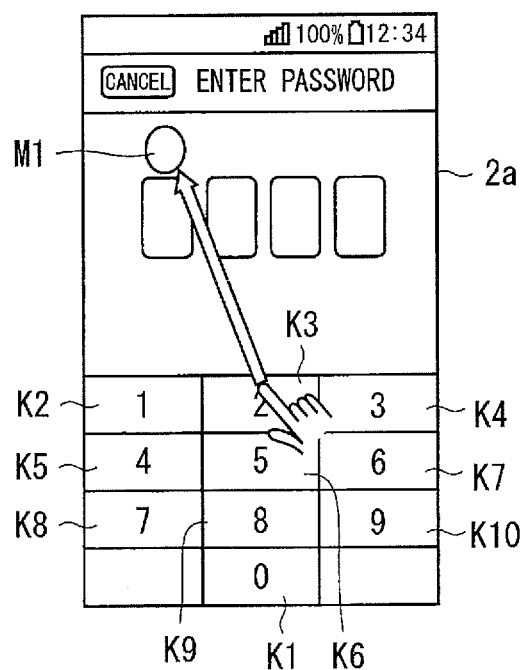
FIG. 12 schematically illustrates an example of an operation performed on an authentication screen.

FIG. 12 schematically illustrates an example of performing an operation in the second authentication. In the authentication screen in FIG. 12, an element M1 is additionally displayed. The element M1 is displayed in a predetermined position. For example, the user brings an operator (finger in FIG. 12) proximate to the element K3, and then slides the operator to the element M1. In the example of FIG. 12, the sliding direction is illustrated by a block arrow. The touch panel 52 detects this sliding, and outputs it to the second authenticator 12. The second authenticator 12 determines a number ("2" in FIG. 10) corresponding to the operated element K3, as one of components of the password. The user can enter the password by sequentially sliding the elements K1 to K10 as necessary.

As described above, entering a password in the second authentication can be made more difficult by using sliding from each of the elements to a predetermined position. Thus, it is possible to further restrain the third party from illegitimately using the electronic apparatus 1 while the user is sleeping.

In the specific examples of FIGS. 9 to 13, the elements K1 to K10 may have a function of authenticating a fingerprint. The fingerprint detector 80 may detect, for example, a fingerprint of a finger that is in contact with a portion of the display area 2a where the elements K1 to K10 are displayed. With this function, when, for example, the third party uses the elements K1 to K10 to enter a password, if the fingerprints detected from the elements K1 to K10 do not match those of the user, the authentication can end in failure. Thus, it is possible to further restrain the third party from illegitimately using the electronic apparatus 1. Furthermore, the third party can be identified by storing a fingerprint of the third party and comparing it with the fingerprints stored in an electronic apparatus or a server.

Figure 13:
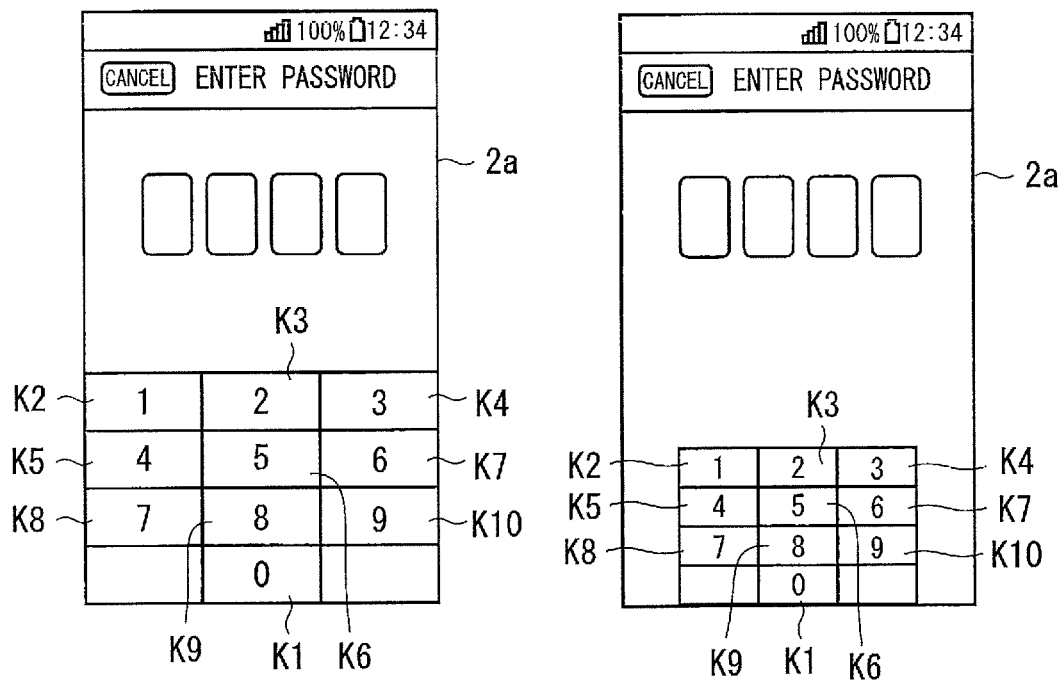
FIG. 13 schematically illustrates an example of authentication screens.

Furthermore, the size of the elements K1 to K10 in the second authentication may be smaller than that of the elements K1 to K10 in the first authentication. FIG. 13 schematically illustrates an example of authentication screens in the first and second authentications. FIG. 13 to the left illustrates the authentication screen in the first authentication, and FIG. 13 to the right illustrates the authentication screen in the second authentication. As illustrated in FIG. 13, the size of the elements K1 to K10 in the second authentication may be smaller than that of the elements K1 to K10 in the first authentication.

Accordingly, the operator has trouble operating the elements K1 to K10 with the size in the second authentication. Thus, the operator has trouble entering a password in the second authentication. Accordingly, it is possible to restrain the third party from illegitimately using the electronic apparatus 1 while the user is sleeping.

Furthermore, the second authenticator 12 does not have to receive a password using elements. However, it may receive a password using, for example, optical character recognition (OCR). The OCR is a technique of analyzing an image including a character, a number, or a symbol to recognize the shape of the character, the number, or the symbol, and identifying a character code corresponding to the character, the number, or the symbol. Hereinafter, "text character" will be used as a term including a character, a number, or a symbol.

Herein, the images captured by the image sensor 60 are used. Specifically, the user images each of components (for example, numbers) of a password through the image sensor 60. The image sensor 60 images, for example, text characters (for example, numbers) printed on a paper. The second authenticator 12 analyzes the image captured by the image sensor 60 to identify a text code of a text character included in the image, and recognizes the text character as one of the components of the password.

Any one of the first image sensor 62 and the second image sensor 64 may be used as the image sensor 60. Nevertheless, the second image sensor 64 located on the rear surface of the electronic apparatus 1 easily images an object in the rear of the electronic apparatus 1. Thus, the second image sensor 64 may be used. Specifically, in performing an authentication while sleep is detected, the second authenticator 12 may instruct the second image sensor 64 to image an object. Upon receipt of the instruction, the second image sensor 64 images the object, and outputs the captured image to the second authenticator 12.

Figure 14:
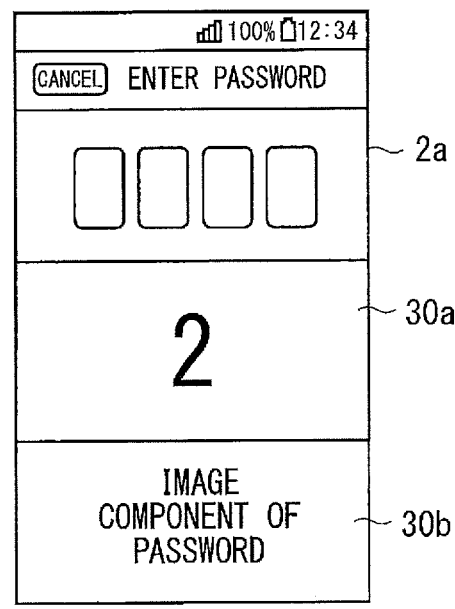
FIG. 14 schematically illustrates an example of an authentication screen.

FIG. 14 schematically illustrates an example of an authentication screen. This authentication screen includes an image area 30*a* and a description area 30*b*. In the image area 30*a*, an image captured by the image sensor 60 (for example, the second image sensor 64) is displayed. In other words, the second authenticator 12 receives the captured image from the image sensor 60, and displays it in the image area 30*a*. The description area 30*b* shows a sentence urging the user to image a component (for example, a number) of a password to be displayed in the image area 30*a*. The example of FIG. 14 shows "IMAGE COMPONENT OF PASSWORD". Furthermore, a number "2" is displayed in the image area 30*a* in the example of FIG. 14.

The second authenticator 12 analyzes the image captured by the image sensor 60 using OCR to identify a text code of a text character included in the image, and determines the text character as a component of the password. The user sequentially images each of the text characters in the image area 30*a* so as to allow the password to be entered.

The operator will have trouble entering a password in the second authentication because he/she needs to prepare or find, for example, a document that contains a desired text character (e.g., the number "2") to enter a password. Thus, it is possible to further restrain the third party from illegitimately using the electronic apparatus 1 while the user is sleeping.

Any conditions may be used as a start trigger for starting OCR. The OCR process may start, for example, when details of a captured image do not change over a predetermined time period. Furthermore, for example, an element functioning as a button for a start trigger may be displayed in an authentication screen. Since this holds true for processes on captured images (for example, face recognition and iris recognition) to be described hereinafter, the description thereof will not be repeated.

Embodiment 3

Embodiment 3 will describe other examples of the second authentication to be executed while the user is sleeping. For example, biometrics may be used as the second authentication. The specific examples will be described hereinafter.

Figure 15:
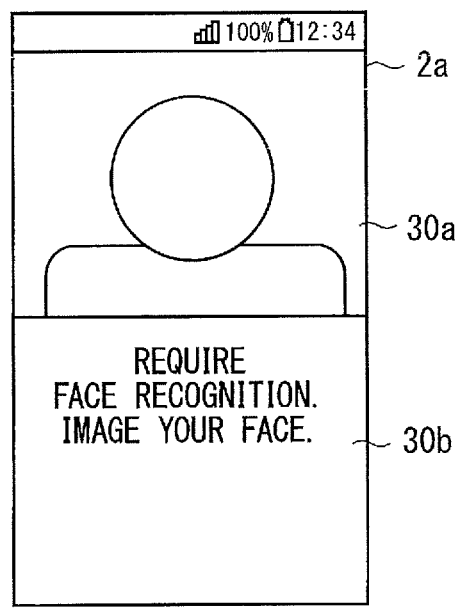
FIG. 15 schematically illustrates an example of an authentication screen.

For example, face recognition may be used as the second authentication. The second authenticator 12 causes the display 30 to display, for example, a face recognition screen. FIG. 15 schematically illustrates an example of the face recognition screen. This face recognition screen includes the image area 30*a* and the description area 30*b*. The image area 30*a* shows an image captured by the image sensor 60. Any one of the first image sensor 62 and the second image sensor 64 may be used as the image sensor 60. Nevertheless, the first image sensor 62 located on the front surface of the electronic apparatus 1 easily captures an image of the face of the user. Thus, the first image sensor 62 may be used. Specifically, in performing an authentication while sleep is detected, the second authenticator 12 may instruct the first image sensor 62 to capture an image. Upon receipt of the instruction, the first image sensor 62 captures the image, and outputs the captured image to the second authenticator 12.

The description area 30*b* shows a sentence describing how to use face recognition. For example, the description area 30*b* shows a sentence instructing the user to image his/her face to be displayed in the image area 30*a*. The example of FIG. 15 shows "REQUIRE FACE RECOGNITION. IMAGE YOUR FACE."

The second authenticator 12 analyzes the image captured by the image sensor 60, and extracts an image of the face of a person included in the captured image. Then, the second authenticator 12 determines whether the extracted image of the face resembles the image of the face of the user previously stored in the storage. Any methods may be used as algorisms of such face recognition. For example, the second authenticator 12 extracts feature points from the image of the face, and determines whether the extracted feature points resemble feature points of a registered image of a face. The second authenticator 12 determines that the second authentication has been successful when determining that these images of the faces resemble each other, and determines that the second authentication has failed when determining that these images of the faces do not resemble each other.

Figure 16:
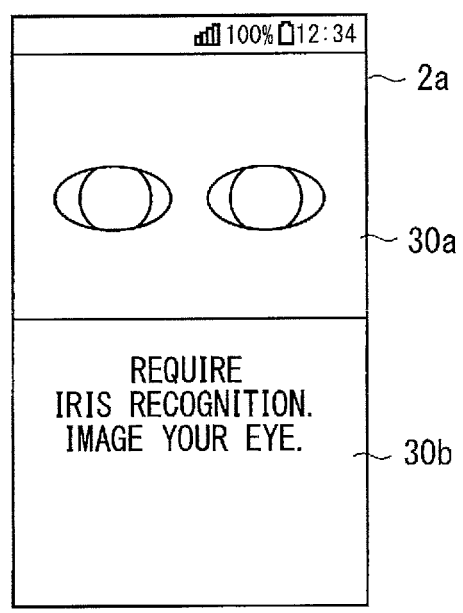
FIG. 16 schematically illustrates an example of an authentication screen.

Alternatively, iris recognition may be used as the second authentication. The second authenticator 12 causes the display 30 to display, for example, an iris recognition screen. FIG. 16 schematically illustrates an example of the iris recognition screen. This iris recognition screen includes the image area 30*a* and the description area 30*b*. The image area 30*a* shows an image captured by the image sensor 60. Any one of the first image sensor 62 and the second image sensor 64 may be used as the image sensor 60. Nevertheless, the first image sensor 62 located on the front surface of the electronic apparatus 1 easily captures an image of the eyes of the user. Thus, the first image sensor 62 may be used. Specifically, in performing an authentication while sleep is detected, the second authenticator 12 may instruct the first image sensor 62 to capture an image. Upon receipt of the instruction, the first image sensor 62 captures the image, and outputs the captured image to the second authenticator 12.

The description area 30*b* shows a sentence describing how to use iris recognition. For example, the description area 30*b* shows a sentence instructing the user to image his/her eyes to be displayed in the image area 30*a*. The example of FIG. 16 shows "REQUIRE IRIS RECOGNITION. IMAGE YOUR EYE."

The second authenticator 12 analyzes the image captured by the image sensor 60, and extracts an image of the eye included in the captured image. The image of the eye includes information on the iris. Then, the second authenticator 12 determines whether the extracted image of the eye resembles the image of the eye of the user previously stored in the storage. The second authenticator 12 determines that the second authentication has been successful when determining that these images resemble each other, and determines that the second authentication has failed when determining that these images do not resemble each other.

Figure 17:
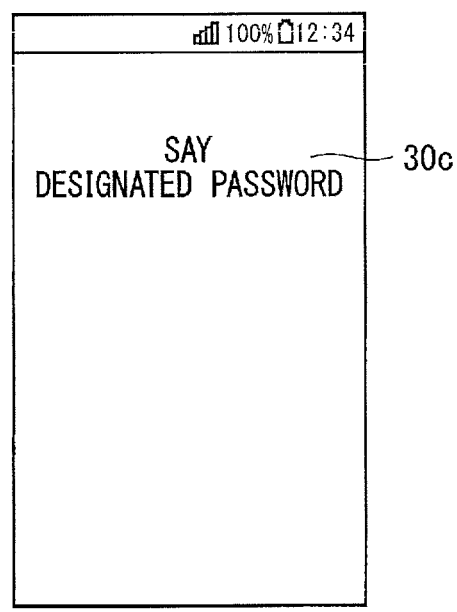
FIG. 17 schematically illustrates an example of an authentication screen.

Alternatively, voiceprint identification may be performed as the second authentication. The second authenticator 12 causes the display 30 to display, for example, a voiceprint identification screen. FIG. 17 schematically illustrates an example of the voiceprint identification screen. The voiceprint identification screen shows a sentence 30c explaining how to use voiceprint identification. This sentence 30c is a sentence urging the user to say a designated word. The example of FIG. 17 shows "SAY DESIGNATED PASSWORD".

The second authenticator 12 analyzes a voice signal entered from the voice input unit 46 to generate voiceprint information indicating a voiceprint of the user. The second authenticator 12 generates the voiceprint information by applying, for example, the Fourier transform to the voice signal. Then, the second authenticator 12 determines whether this voiceprint information resembles voiceprint information of the user previously stored in the storage. The second authenticator 12 determines that the second authentication has been successful when determining that these resemble each other, and determines that the second authentication has failed when determining that these do not resemble each other.

Since the second authentication different from the first authentication is performed also in Embodiment 3, it is possible to restrain the third party from illegitimately using the electronic apparatus 1 while the user is sleeping.

Embodiment 4

Embodiment 4 is not necessarily predicated on Embodiments 1 to 3. In other words, an authentication method does not necessarily have to be changed by the presence or absence of detection of sleep in Embodiment 4.

Figure 18:
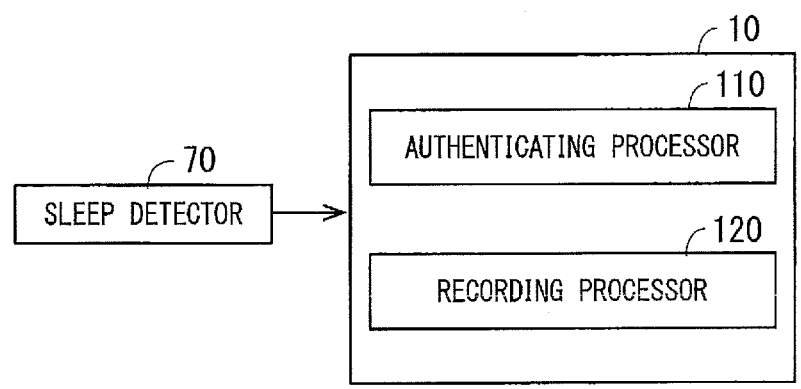
FIG. 18 schematically illustrates an example of a configuration of the controller.

FIG. 18 schematically illustrates an example of an internal configuration of the controller 10. The controller 10 includes the authenticating processor 110 and a recording processor 120. The authenticating processor 110 may perform the same authentication irrespective of the presence or absence of detection of sleep, or include the first authenticator 11 and the second authenticator 12 as described in Embodiments 1 to 3.

The recording processor 120 can perform a recording process using the first image sensor 62 when the sleep detector 70 detects sleep and the authenticating processor 110 performs an authentication. In other words, the recording processor 120 performs a recording process using the first image sensor 62 when the third party performs an authentication while the user is sleeping. The recording herein means generating a captured image by an image sensor and storing the captured image in a non-volatile storage.

Figure 19:
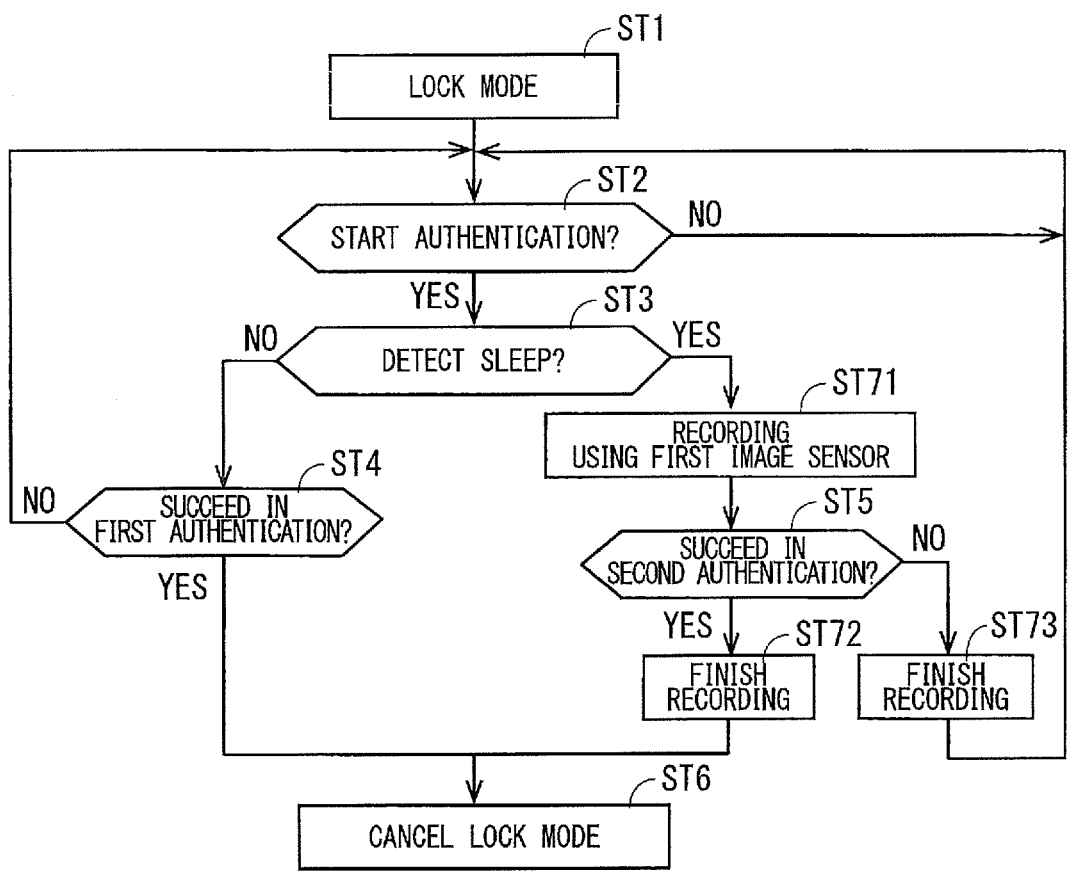
FIG. 19 illustrates a flowchart showing an example of specific operations performed by the controller.

FIG. 19 illustrates a flowchart showing an example of the operations performed by the controller 10. This flowchart shows operations in performing the first and second authentications according to the presence or absence of detection of sleep as described in Embodiment 1. Since this holds true for other Embodiments to be described hereinafter, the description thereof will not be repeated.

In the operations of FIG. 19, steps ST71 to ST73 are additionally performed with respect to FIG. 5. The step ST71 is performed when the sleep detector 70 detects sleep at the step ST3. The recording processor 120 instructs the first image sensor 62 to capture an image at the step ST71.

The first image sensor 62 starts capturing the image according to the instruction, and outputs the captured image to the recording processor 120. The recording processor 120 stores the captured image in a non-volatile storage (for example, the storage 103). The recording is performed in such a manner.

The step ST71 is followed by the step ST5. When the second authenticator 12 determines that the second authentication has been successful at the step ST5, the recording processor 120 finishes the recording process at the step ST72. Next at the step ST6, the controller 10 cancels the lock mode. When the second authenticator 12 determines that the second authentication has failed at the step ST5, the recording processor 120 finishes the recording process at the step ST73. Then, the step ST2 is again performed.

As described above, the first image sensor 62 performs the recording process while the second authentication is being executed. When capturing an object in front of the electronic apparatus 1, if the third party is in the imaging range, the first image sensor 62 can capture an image of the third party. Thus, the user can identify the third party who attempts to operate the electronic apparatus 1 while the user is sleeping, when the controller 10 reproduces the captured image stored in the storage.

If YES is selected at the step ST5, the recording process may be terminated after canceling the lock mode.

Embodiment 5

Figure 20:
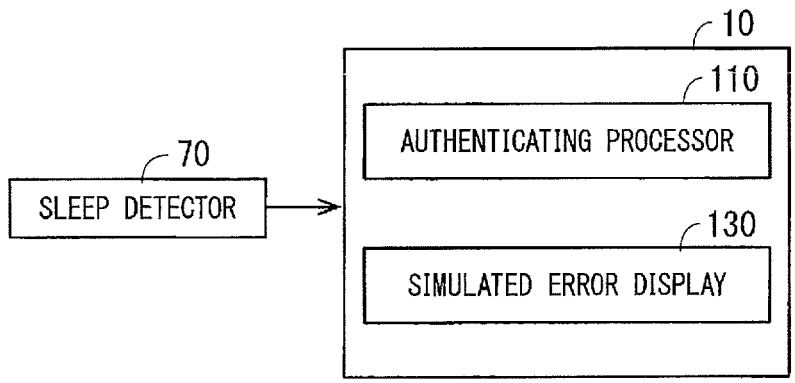
FIG. 20 schematically illustrates an example of a configuration of the controller.

Embodiment 5 is not necessarily predicated on Embodiments 1 to 4. FIG. 20 schematically illustrates an example of an internal configuration of the controller 10. The controller 10 includes the authenticating processor 110 and a simulated error display 130. The authenticating processor 110 may perform the same authentication irrespective of the presence or absence of detection of sleep, or include the first authenticator 11 and the second authenticator 12 as described in Embodiments 1 to 3.

Figure 21:
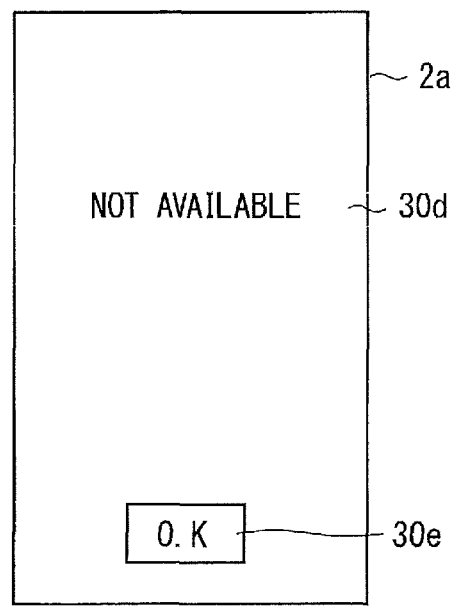
FIG. 21 schematically illustrates an example of a simulated error screen.

The simulated error display 130 can cause the display 30 to display a simulated error screen, when a trigger to start an authentication has been entered and sleep is detected. In other words, the simulated error screen is displayed when the third party performs an authentication while the user is sleeping. FIG. 21 schematically illustrates an example of the simulated error screen. In the example of FIG. 21, the simulated error screen shows information indicating unavailability of the electronic apparatus 1. Specifically, the example of FIG. 21 shows a sentence 30d "NOT AVAILABLE".

Furthermore, the simulated error screen in the example of FIG. 21 shows an element 30e. The element 30e functions as a button for terminating the display of the simulated error screen.

The authenticating processor 110 receives an input for an authentication (for example, the second authentication) after a lapse of a predetermined time since the simulated error screen is displayed. The authenticating processor 110, for example, receives an input of a fingerprint detected by the fingerprint detector 80, or causes the display 30 to display an authentication screen to receive inputs to the elements K1 to K10. The lapse of time may be measured by any time-measuring unit (for example, a timer circuit).

Figure 22:
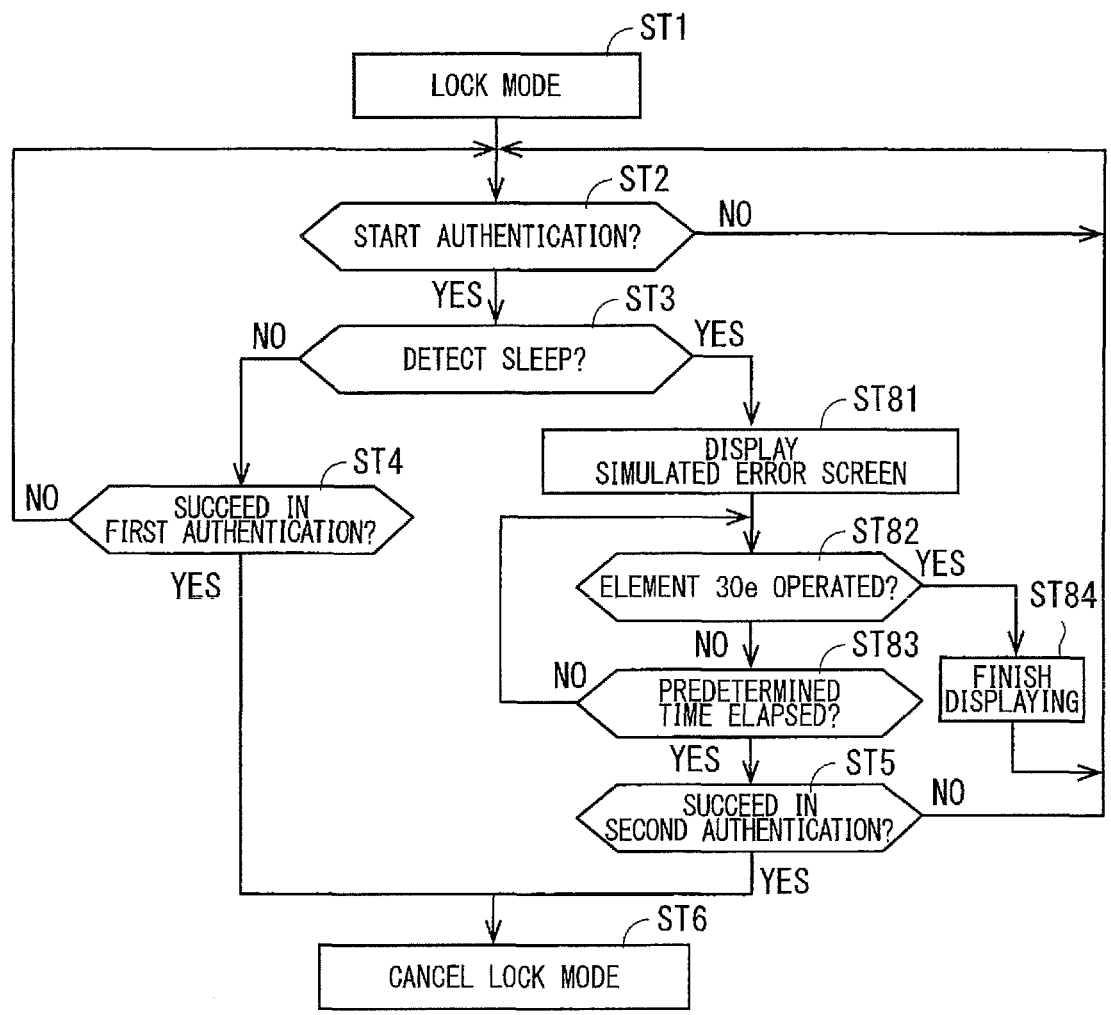
FIG. 22 illustrates a flowchart showing an example of specific operations performed by the controller.

FIG. 22 illustrates a flowchart showing an example of the operations performed by the controller 10. In the operations of FIG. 22, steps ST81 to ST84 are additionally performed with respect to FIG. 5. The step ST81 is performed when the authenticating processor 110 determines that the sleep detector 70 has detected sleep at the step ST3. The simulated error display 130 causes the display 30 to display a simulated error screen at the step ST81. Next, the simulated error display 130 determines whether the element 30*e* is operated at the step ST82. When determining that the element 30*e* has been operated, the simulated error display 130 causes the display 30 to finish displaying the simulated error screen at the step ST84. Next, the step ST2 is again performed. In other words, when the element 30*e* is operated during display of the simulated error screen, the authentication is not performed.

When the simulated error display 130 determines that the element 30*e* is not operated at the step ST82, the authenticating processor 110 determines at the step ST83 whether a predetermined time has elapsed since the execution of the step ST81. When the predetermined time has not elapsed yet, the step ST82 is again performed. When the authenticating processor 110 determines that the predetermined time has elapsed at the step ST83, the step ST5 is performed.

As described above, the authenticating processor 110 performs the authentication in the authentication method of the present disclosure, after a lapse of a predetermined time since the simulated error screen is displayed. Thus, the third party who does not know such a function is fooled by the simulated error screen into thinking that the electronic apparatus 1 cannot be used. Thus, for example, the third party finishes operating the electronic apparatus 1 by clicking the element 30*e* to terminate the display of the simulated error screen. Accordingly, it is possible to further restrain the third party from illegitimately using the electronic apparatus 1.

The element 30*e* does not necessarily have to be displayed. The simulated error screen may be terminated with the operation key 5 (for example, the power key 5A) depressed. Furthermore, with the power key 5A depressed, the display on the display 30 may be terminated. When the display 30 is, for example, a liquid crystal display panel, the backlight may be turned OFF. Accordingly, the display of the simulated error screen can be terminated.

Furthermore, the controller 10 may use a sleep mode with the power key 5A depressed. The sleep mode is a mode in which a part of the functions of the electronic apparatus 1 including a display function is stopped. In the sleep mode, a part of the constituent elements of the electronic apparatus 1 such as the display 30, the touch panel 52, and the fingerprint detector 80 does not work. Accordingly, the power consumption of the electronic apparatus 1 is reduced in the sleep mode. Furthermore, for example, the controller 10 can receive an incoming call signal for call or message through the wireless communication unit 20 in the sleep mode.

The user often uses the sleep mode when he/she does not use the electronic apparatus 1, In other words, when the third party who attempts to perform the second authentication while the user is sleeping views the simulated error screen and determines that the electronic apparatus 1 cannot be used, the power key 5A is often depressed. Here, the second authentication may be terminated, and the sleep mode may be used.

Furthermore, with the power key 5A depressed in the sleep mode, the controller 10 may cancel the sleep mode in response to the depressing. Furthermore, the authenticating processor 110 may regard this depressing as a trigger to start an authentication. In other words, the authentication method of the present disclosure may be executed again with the power key 5A depressed in the sleep mode. The power key 5A may be used as the trigger to start an authentication in other embodiments.

Embodiment 6

Figure 23:
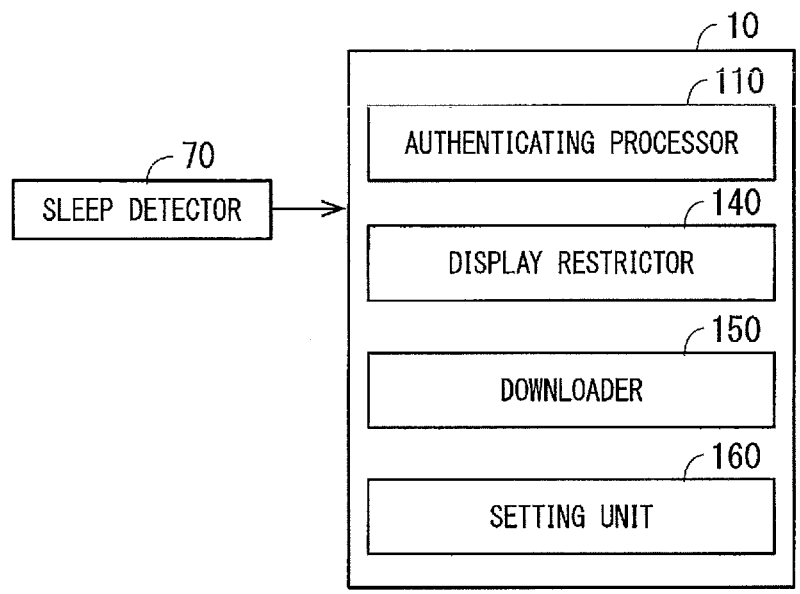
FIG. 23 schematically illustrates an example of a configuration of the controller.

Embodiment 6 is not necessarily predicated on Embodiments 1 to 5. FIG. 23 schematically illustrates an example of an internal configuration of the controller 10. The controller 10 includes the authenticating processor 110 and a display restrictor 140. The authenticating processor 110 may perform the same authentication irrespective of the presence or absence of detection of sleep, or include the first authenticator 11 and the second authenticator 12 as described in Embodiments 1 to 3.

The controller 10 cancels the lock mode when sleep is detected and the authentication is made successful. Here, the display restrictor 140 can restrict information to be displayed on the display 30. In other words, when the third party has probably succeeded in an authentication while the user is sleeping, the display restrictor 140 restricts the information to be displayed on the display 30. The information to be restricted is information generated or changed by the user.

The storage 103 stores, for example, applications previously stored and applications obtained by the user. The controller 10 includes, for example, a downloader 150 as illustrated in FIG. 23. This downloader 150 can obtain an application in response to an input by the user. The downloader 150 receives an application from an external apparatus through, for example, the wireless communication unit 20, and stores it in the storage 103. Accordingly, the application obtained in response to an input by the user is an example of the information generated by the user.

Furthermore, the user may install various settings in the electronic apparatus 1. The controller 10 includes, for example, a setting unit 160 as illustrated in FIG. 23. The setting unit 160 sets the various settings to the electronic apparatus 1 in response to an input by the user. The setting device 160 can set, for example, a background image to be displayed on the display 30, in response to an input by the user. Such a background image is an example of the information changed by the user.

Figure 24:
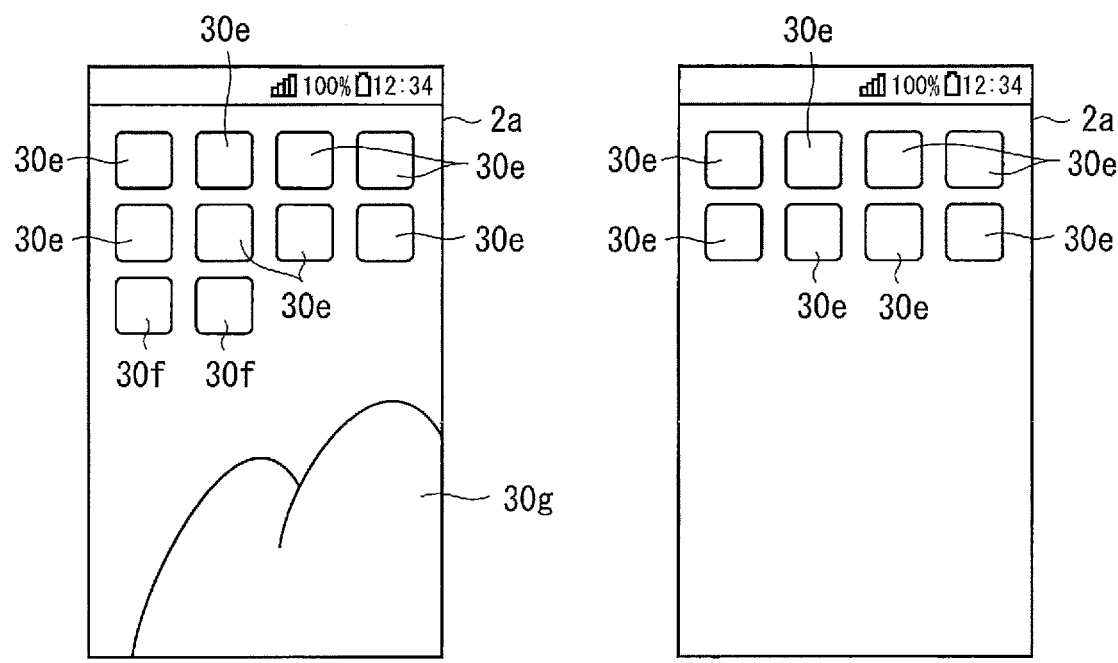
FIG. 24 schematically illustrates examples of a home screen and a simulated home screen.

For example, the display restrictor 140 does not cause the display 30 to display the information when the authentication has been successful in a state where sleep is detected. FIG. 24 schematically illustrates examples of home screens to be displayed when an authentication has been successful, or when the lock mode is canceled. The home screen to the left of FIG. 24 is a screen to be displayed when the authentication has been successful in a state where sleep is not detected (will be hereinafter referred to as "normal home screen"). The home screen to the right of FIG. 24 is a screen to be displayed when the authentication has been successful in a state where sleep is detected (will be hereinafter referred to as "simulated home screen").

As exemplified in FIG. 24, elements 30*e* and 30*f* are displayed in the normal home screen. Each of the elements 30*e* and 30*f* functions as a button that activates an application. The elements 30*e* correspond to the respective applications previously stored in the storage 103, and the elements 30*f* correspond to the respective applications obtained by the user and stored in the storage 103.

Furthermore, a background image 30*g* is displayed in the normal home screen in the example of FIG. 24. The background image 30*g* is a background image set by the user, for example, an image of a mountain.

In the simulated home screen, the elements 30*f* are not displayed but the elements 30*e* are displayed. Furthermore, the background image 30*g* is not displayed. A preset image may be displayed as a background image.

Furthermore, examples of the information include an image captured by the image sensor 60, phone directory information to be used in calls, and a message to be transmitted and received to and from another electronic apparatus. These can be displayed in a home screen.

As described above, when sleep is detected, even when the authentication has been successful, display of the information generated or changed by the user is restricted. Thus, even when the third party operates the electronic apparatus 1, the third party hardly knows the information (for example, interest or preferences) of the user from the electronic apparatus 1.

Figure 25:
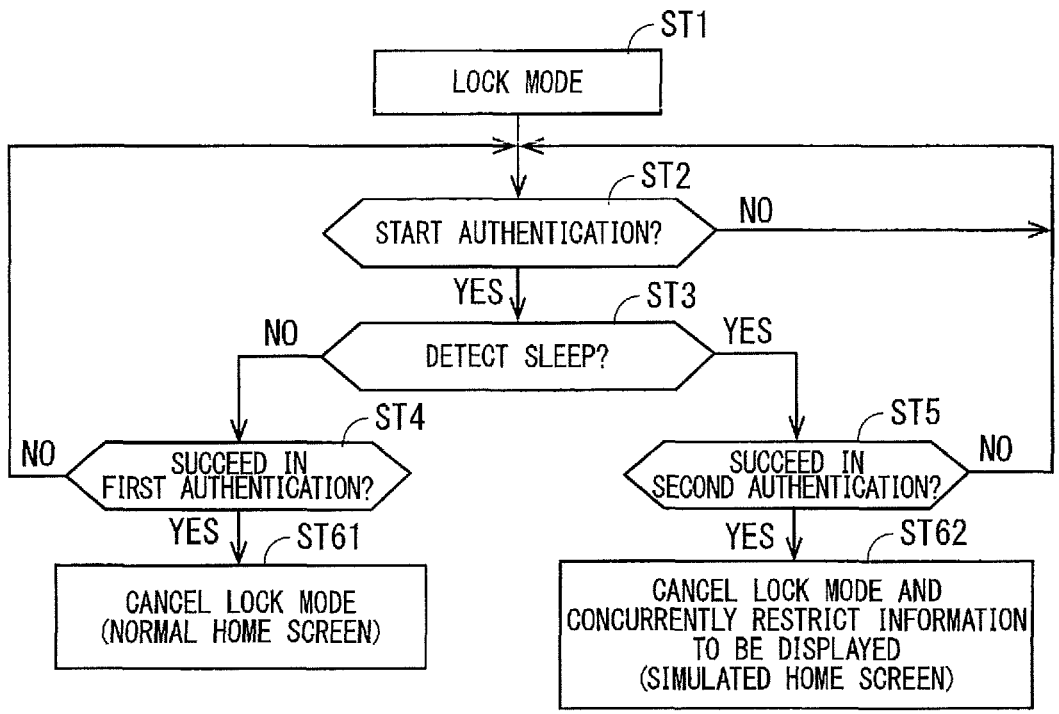
FIG. 25 illustrates a flowchart showing an example of specific operations performed by the controller.

FIG. 25 illustrates a flowchart showing an example of the operations performed by the controller 10. In the operations of FIG. 25, steps ST61 and ST62 are performed as a replacement for the step ST6 in FIG. 5. The step ST61 is performed when the authentication has been successful in a state where sleep is not detected. The step ST61 is performed if YES is selected at the step ST4 in the example of FIG. 25. At the step ST61, the controller 10 cancels the lock mode. The controller 10 causes the display 30 to display, for example, a normal home screen.

The step ST62 is performed when the authentication has been successful in a state where sleep is detected. The step ST62 is performed if YES is selected at the step ST5 in the example of FIG. 25. At the step ST62, the controller 10 cancels the lock mode, and the display restrictor 140 concurrently restricts information to be displayed on the display 30. The controller 10 causes the display 30 to display, for example, a simulated home screen.

The display restrictor 140 does not have to restrict display of the whole information generated or changed by the user but should restrict at least a piece of the information. Furthermore, the information to be restricted is not limited to information on a home screen. For example, the display restrictor 140 may restrict the information generated or changed by the user in each application. For example, the phone directory information does not have to be displayed in a call application. The phone directory information includes telephone numbers and personal information (for example, names), and is a piece of the information generated or changed by the user.

Furthermore, the information to be restricted may be preset, or set by the user.

Embodiment 7

Embodiment 7 will describe conditions for performing the second authentication. Embodiment 7 is not necessarily predicated on Embodiments 1 to 6.

[Acceleration]

Figure 26:
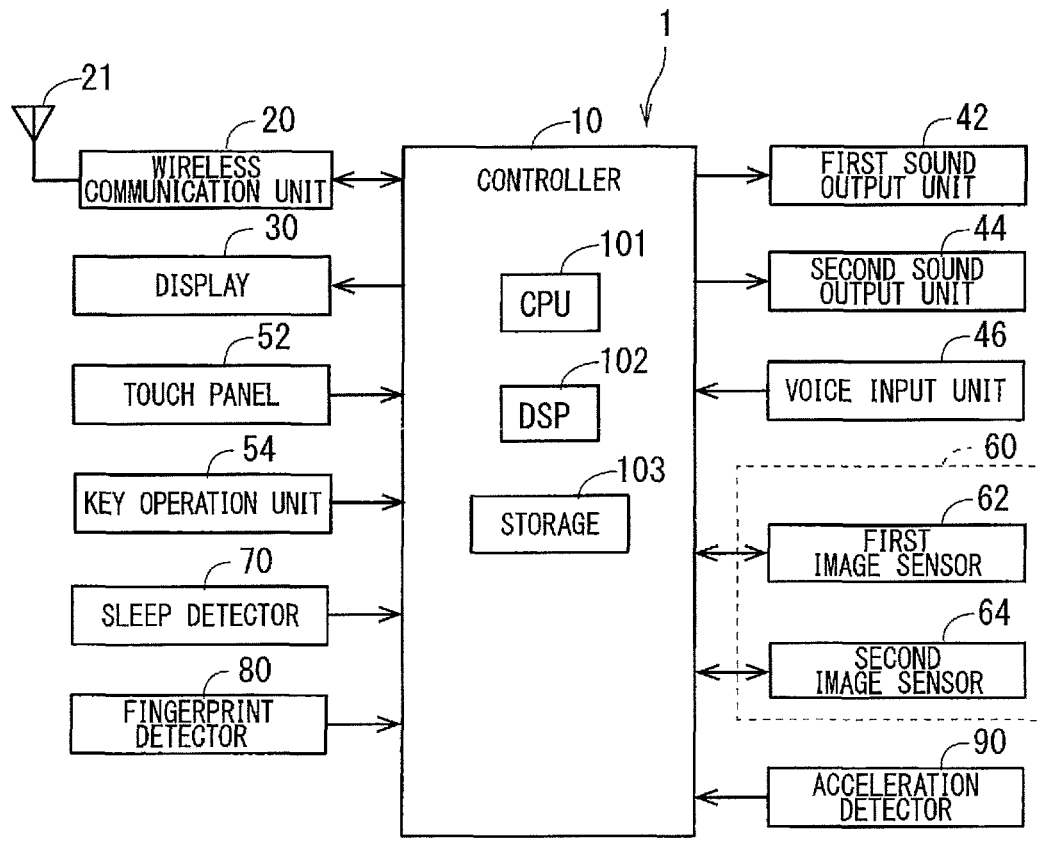
FIG. 26 schematically illustrates an example of an electrical configuration of the electronic apparatus.

FIG. 26 schematically illustrates an example of an electrical configuration of the electronic apparatus 1. The electronic apparatus 1 additionally includes an acceleration detector 90 with respect to FIG. 3. The acceleration detector 90 can measure an acceleration occurring in the electronic apparatus 1. Examples of the acceleration detector 90 include a strain gauge acceleration sensor, a piezoelectric acceleration sensor, and a capacitive acceleration sensor. When the user spatially moves the electronic apparatus 1, the acceleration corresponding to the movement occurs in the electronic apparatus 1. The acceleration detector 90 measures the acceleration, and outputs it to the controller 10.

When the user starts operating the electronic apparatus 1, the user often moves the electronic apparatus 1 spatially to a position at which the user can easily operate the electronic apparatus 1. Here, the acceleration detector 90 measures an acceleration occurring in the electronic apparatus 1. In other words, the acceleration detector 90 measures an acceleration when the authentication starts.

If the third party operates the electronic apparatus 1, for example, without changing the position set before the user sleeps, when the user wakes up, the user hardly knows that the third party has operated the electronic apparatus 1. In other words, when the electronic apparatus 1 is operated without changing the position thereof, it is highly probable that the third party has operated the electronic apparatus 1. Put it differently, when an authentication starts while the electronic apparatus 1 is spatially still over a long time period, the operator is probably not the legitimate user but an illegitimate third party.

When a variation in the acceleration measured by the acceleration detector 90 falls below an acceleration reference value over a predetermined time period, the second authenticator 12 in the authenticating processor 110 may perform the authentication. Accordingly, when it is highly probable that the third party operates the electronic apparatus 1, the second authentication different from the normal first authentication can be performed. Thus, even when the third party illegitimately obtains details of the operations on the first authentication of the user, the second authentication will end in failure based on the details. Thus, it is possible to restrain the third party from illegitimately using the electronic apparatus 1.

Figure 27:
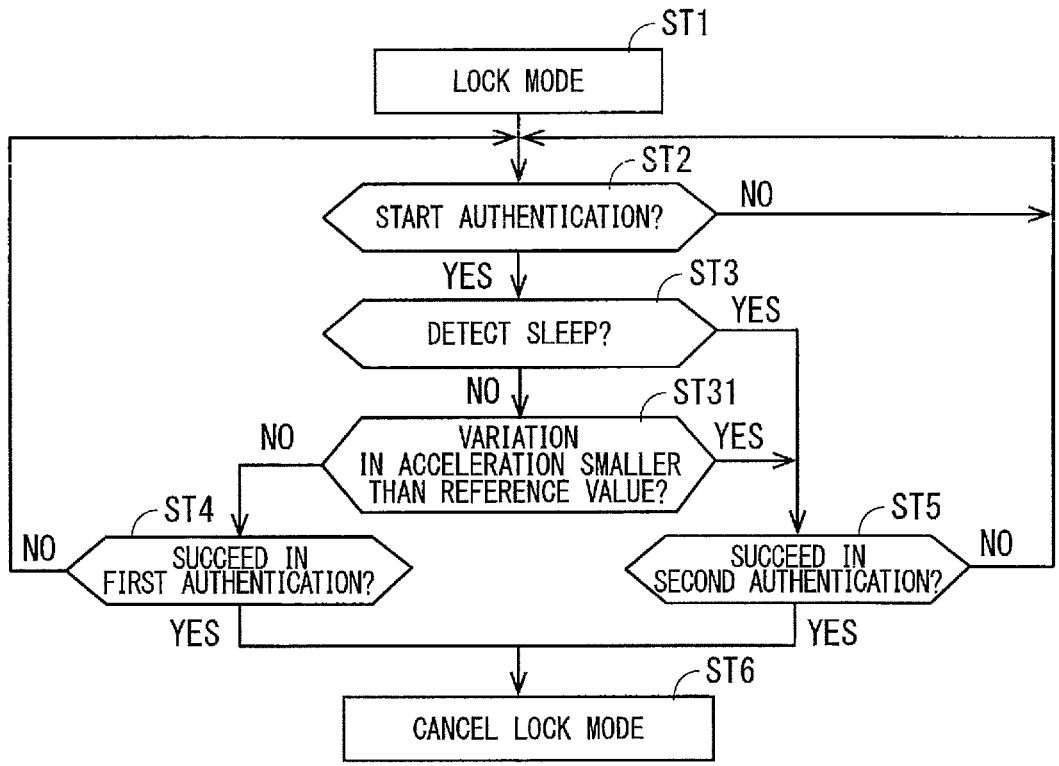
FIG. 27 illustrates a flowchart showing an example of specific operations performed by the controller.

FIG. 27 illustrates a flowchart showing an example of the operations performed by the controller 10. Although detection of sleep does not have to be used as one of the conditions on the second authentication in Embodiment 7, this flowchart shows the operations when sleep is detected as Embodiment 1. Since this holds true for other flowcharts to be described hereinafter, the description thereof will not be repeated.

In the operations of FIG. 27, a step ST31 is additionally performed with respect to FIG. 5. The step ST31 is performed if YES is selected at the step ST2. The step ST31 is performed if NO is selected at the step ST3 in the example of FIG. 27. The authenticating processor 110 determines whether a variation in the acceleration over a predetermined time period is smaller than an acceleration reference value at the step ST31. The predetermined time period may include a time point when the step ST2 is executed. In other words, the variation may include an acceleration before a trigger to start an authentication is entered. A predetermined comparator can be used to determine the magnitude relationship.

When the authenticating processor 110 determines that the variation in acceleration is larger than the acceleration reference value, the step ST4 is performed. Specifically, when sleep is not detected and the variation in the acceleration is larger than the acceleration reference value, the first authentication is performed based on the assumption that the legitimate user is operating the electronic apparatus 1. When the authenticating processor 110 determines that the variation in the acceleration is smaller than the acceleration reference value at the step ST31, the step ST5 is performed. Specifically, when sleep is detected or the variation in the acceleration is smaller than the acceleration reference value, the second authentication is performed based on the assumption that the third party is operating the electronic apparatus 1. Thus, it is possible to further restrain the third party from illegitimately using the electronic apparatus 1.

The step ST3 and the step ST31 may be executed in an opposite order. In other words, the step ST3 may be performed if NO is selected at the step ST31, and the step ST4 may be performed if NO is selected at the step ST3. This holds true for other flowcharts to be described hereinafter.

[Inclination]

Figure 28:
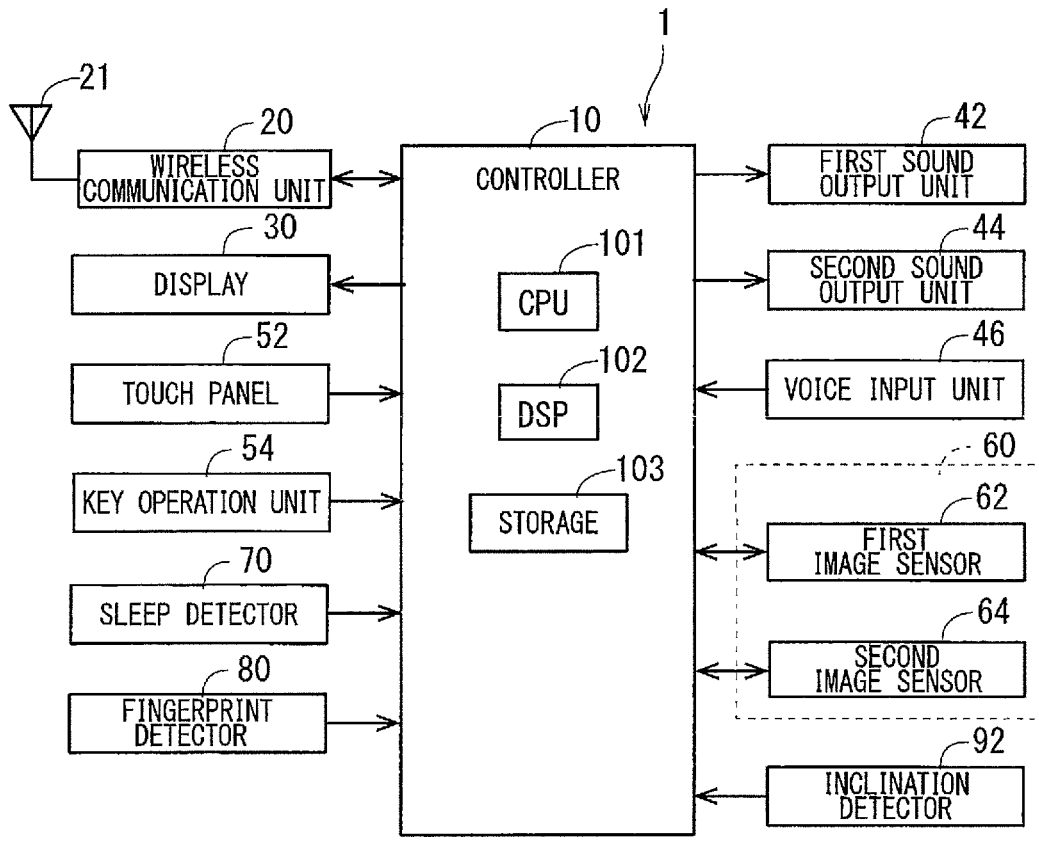
FIG. 28 schematically illustrates an example of an electrical configuration of the electronic apparatus.

FIG. 28 schematically illustrates an example of an electrical configuration of the electronic apparatus 1. The electronic apparatus 1 additionally includes an inclination detector 92 with respect to FIG. 3. The inclination detector 92 can measure an inclination angle of the electronic apparatus 1 relative to a base level (for example, the ground). The inclination detector 92 includes, for example, an acceleration detector. This acceleration detector can measure accelerations in three directions that occur in the electronic apparatus 1. Since the accelerations occurring in the electronic apparatus 1 include a gravitational acceleration, the acceleration detector can detect a direction of the gravitational acceleration on the electronic apparatus 1. Accordingly, the inclination detector 92 can measure the inclination angle of the electronic apparatus 1. The inclination detector 92 outputs the measured inclination angle to the controller 10.

When the electronic apparatus 1 is operated at an inclination angle different from that at which the legitimate user operates the electronic apparatus 1, it is highly probable that the operator is the third party.

The second authenticator 12 in the authenticating processor 110 may perform the authentication when the inclination angle measured by the inclination detector 92 falls out of a predetermined range. The user may set the predetermined range. Alternatively, the predetermined range may be determined based on the inclination angle at which the user actually operates the electronic apparatus 1. Specifically, when the user performs the first authentication, the inclination detector 92 may measure the inclination angle of the electronic apparatus 1, and the authenticating processor 110 may determine the predetermined range based on the inclination angle. The predetermined range may be, for example, a predetermined angle range including an inclination angle at which the first authentication is performed.

Accordingly, when it is highly probable that the third party operates the electronic apparatus 1, the second authentication different from the normal first authentication can be performed.

Figure 29:
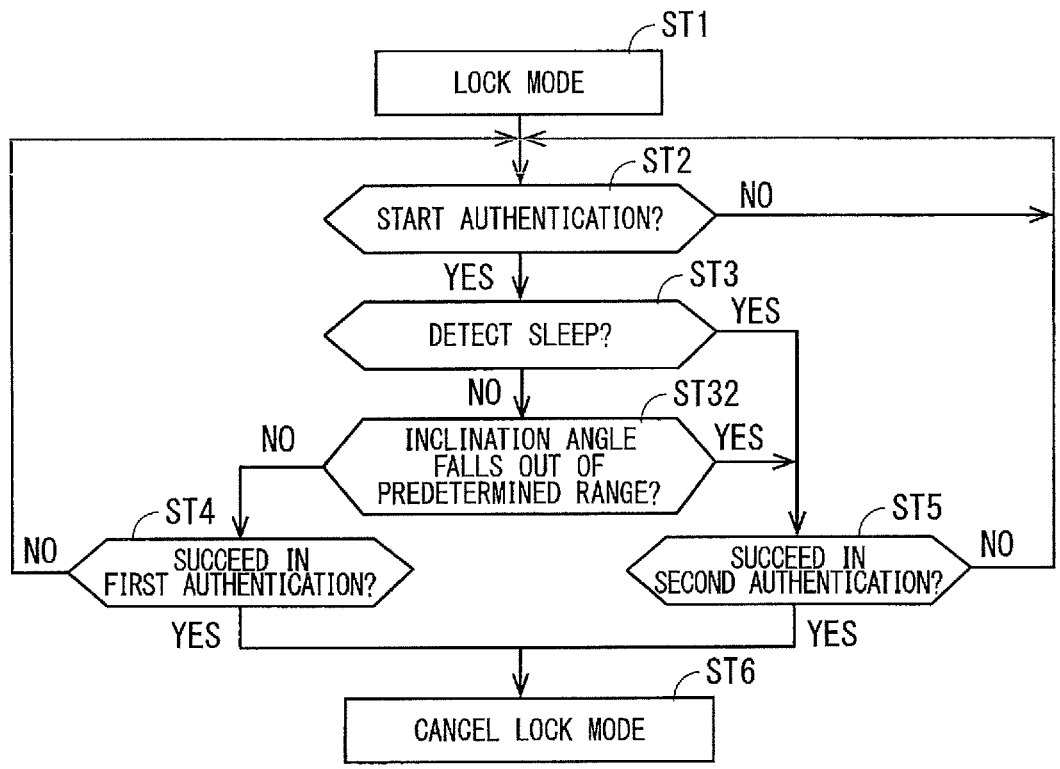
FIG. 29 illustrates a flowchart showing an example of specific operations performed by the controller.

FIG. 29 illustrates a flowchart showing an example of the operations performed by the controller 10. In the operations of FIG. 29, a step ST32 is additionally performed with respect to FIG. 5. The step ST32 is performed if YES is selected at the step ST2. The step ST32 is performed if NO is selected at the step ST3 in the example of FIG. 29. The authenticating processor 110 determines whether the inclination angle measured by the inclination detector 92 falls out of a predetermined range at the step ST32.

When the authenticating processor 110 determines that the inclination angle falls within the predetermined range, the step ST4 is performed. Specifically, when sleep is not detected and the inclination angle falls within the predetermined range, the first authentication is performed based on the assumption that the legitimate user is operating the electronic apparatus 1. When the authenticating processor 110 determines that the inclination angle falls out of the predetermined range at the step ST32, the step ST5 is performed. Specifically, when sleep is detected or the inclination angle falls out of the predetermined range, the second authentication is performed based on the assumption that the third party is operating the electronic apparatus 1. Thus, it is possible to further restrain the third party from illegitimately using the electronic apparatus 1.

[Time Period]

Figure 30:
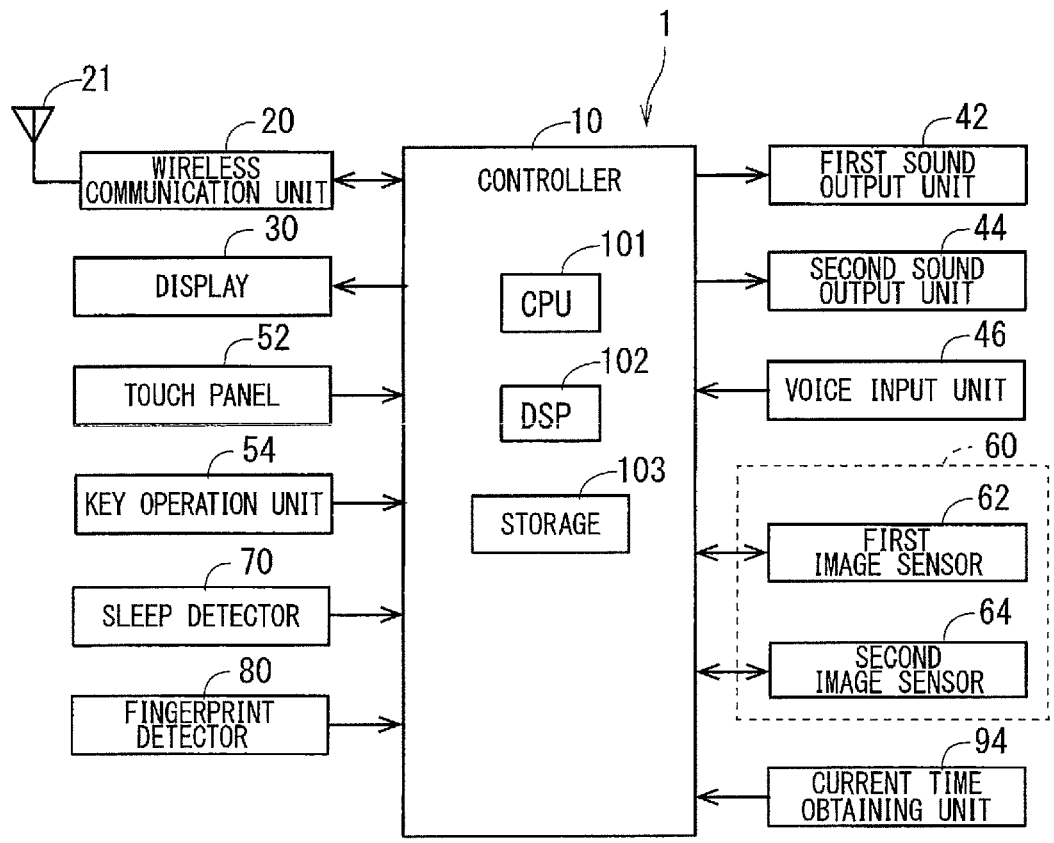
FIG. 30 schematically illustrates an example of an electrical configuration of the electronic apparatus.

FIG. 30 schematically illustrates an example of an electrical configuration of the electronic apparatus 1. The electronic apparatus 1 additionally includes a current time obtaining unit 94 with respect to FIG. 3. The current time obtaining unit 94 can obtain a current time. The current time obtaining unit 94 may be a time-measuring unit (for example, a timer circuit), and may count the current time by itself. Alternatively, the current time obtaining unit 94 may obtain the current time from an external apparatus through the wireless communication unit 20. The current time obtaining unit 94 outputs the obtained time to the controller 10.

When the electronic apparatus 1 is operated during a time period different from that during which the user operates the electronic apparatus 1, it is highly probable that the operator is the third party.

When the current time obtained by the current time obtaining unit 94 is outside a predetermined time period, the second authenticator 12 in the authenticating processor 110 may perform the authentication. The user may set the predetermined time period. Alternatively, the time period may be determined based on the time at which the user actually operates the electronic apparatus 1. Specifically, the current time obtaining unit 94 may obtain the current time at which the user performs the first authentication, and the authenticating processor 110 may determine the time period base on the obtained current time. The time period may be, for example, a predetermined time period including the time at which the first authentication is performed.

Accordingly, when it is highly probable that the third party operates the electronic apparatus 1, the second authentication different from the normal first authentication can be performed.

Figure 31:
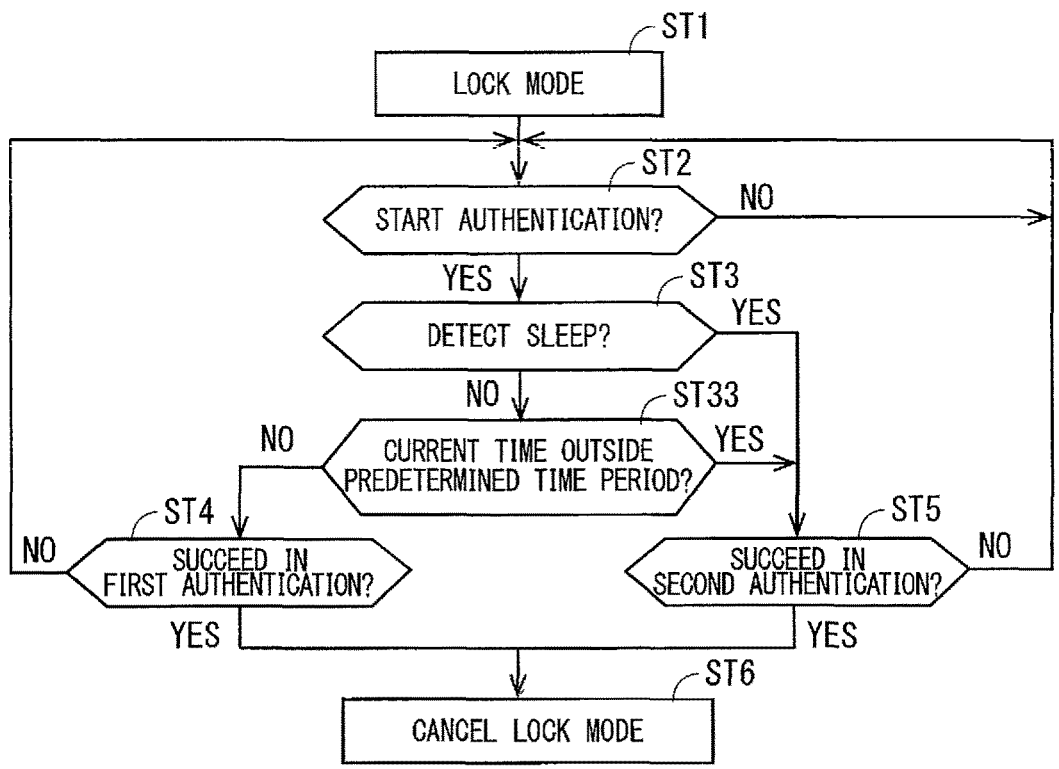
FIG. 31 illustrates a flowchart showing an example of specific operations performed by the controller.

FIG. 31 illustrates a flowchart showing an example of the operations performed by the controller 10. In the operations of FIG. 31, a step ST33 is additionally performed with respect to FIG. 5. The step ST33 is performed if YES is selected at the step ST2. The step ST33 is performed if NO is selected at the step ST3 in the example of FIG. 31. The authenticating processor 110 determines whether the current time obtained by the current time obtaining unit 94 is outside a predetermined time period at the step ST33.

When the authenticating processor 110 determines that the current time falls within the predetermined time period, the step ST4 is performed. Specifically, when sleep is not detected and the current time falls within the predetermined time period, the first authentication is performed based on the assumption that the legitimate user is operating the electronic apparatus 1. When the authenticating processor 110 determines that the current time is outside the predetermined time period at the step ST33, the step ST5 is performed. Specifically, when sleep is detected or the current time is outside the predetermined time period, the second authentication is performed based on the assumption that the third party is operating the electronic apparatus 1. Thus, it is possible to further restrain the third party from illegitimately using the electronic apparatus 1.

[Presence or Absence of Holding Electronic Apparatus]

Figure 32:
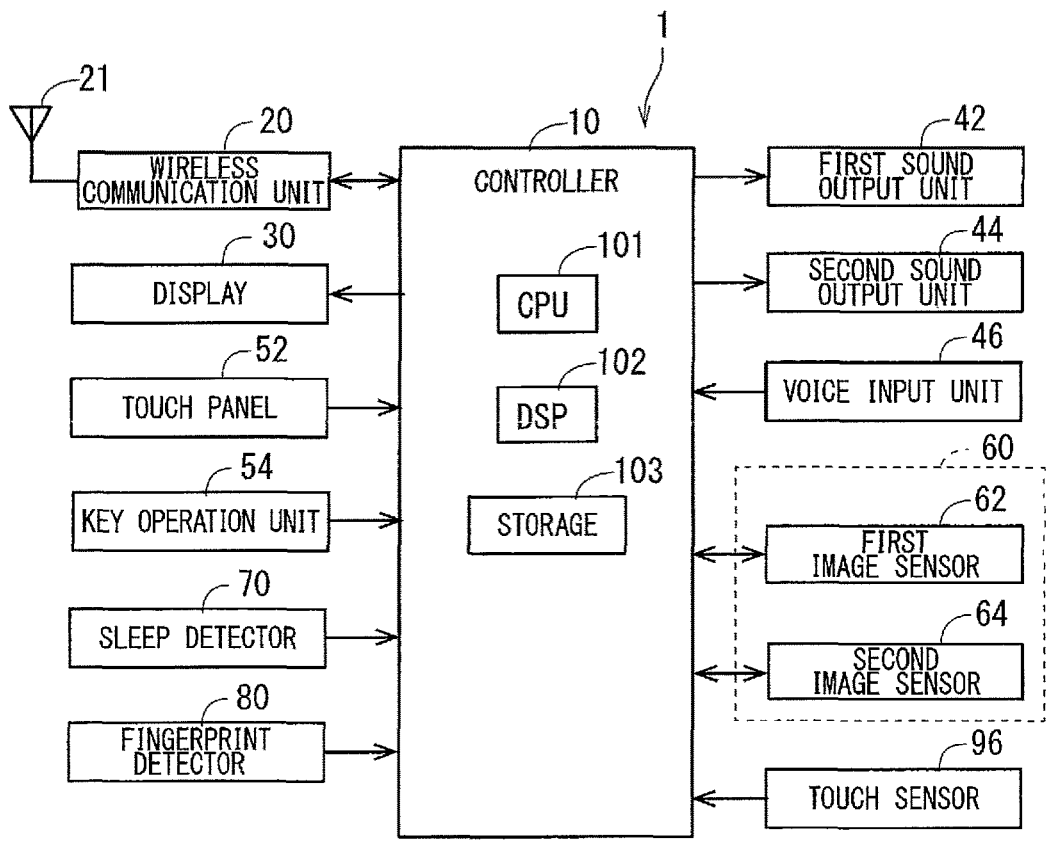
FIG. 32 schematically illustrates an example of an electrical configuration of the electronic apparatus.

FIG. 32 schematically illustrates an example of an electrical configuration of the electronic apparatus 1. The electronic apparatus 1 additionally includes a touch sensor 96 with respect to FIG. 3. This touch sensor 96 is located at the side portion or the rear portion of the electronic apparatus 1. The touch sensor 96 can detect contact of a human body. For example, when the user holds the electronic apparatus 1 and the user's hand is brought proximate to the touch sensor 96, the touch sensor 96 detects the proximity. The touch sensor 96 can detect the proximity based on the same principle as that of the touch panel 52. When detecting the proximity of a human body, the touch sensor 96 outputs a signal indicating the detection to the controller 10.

If the third party operates the electronic apparatus 1, for example, without moving the electronic apparatus 1 set before the user sleeps, when the user wakes up, the user hardly knows that the third party has operated the electronic apparatus 1. In other words, when the electronic apparatus 1 is operated without holding it, it is highly probable that the operation has been performed by the third party.

Here, the second authenticator 12 of the authenticating processor 110 may perform an authentication when the touch sensor 96 does not detect the proximity of a human body. Accordingly, when it is highly probable that the third party operates the electronic apparatus 1, the second authentication different from the normal first authentication can be performed.

Figure 33:
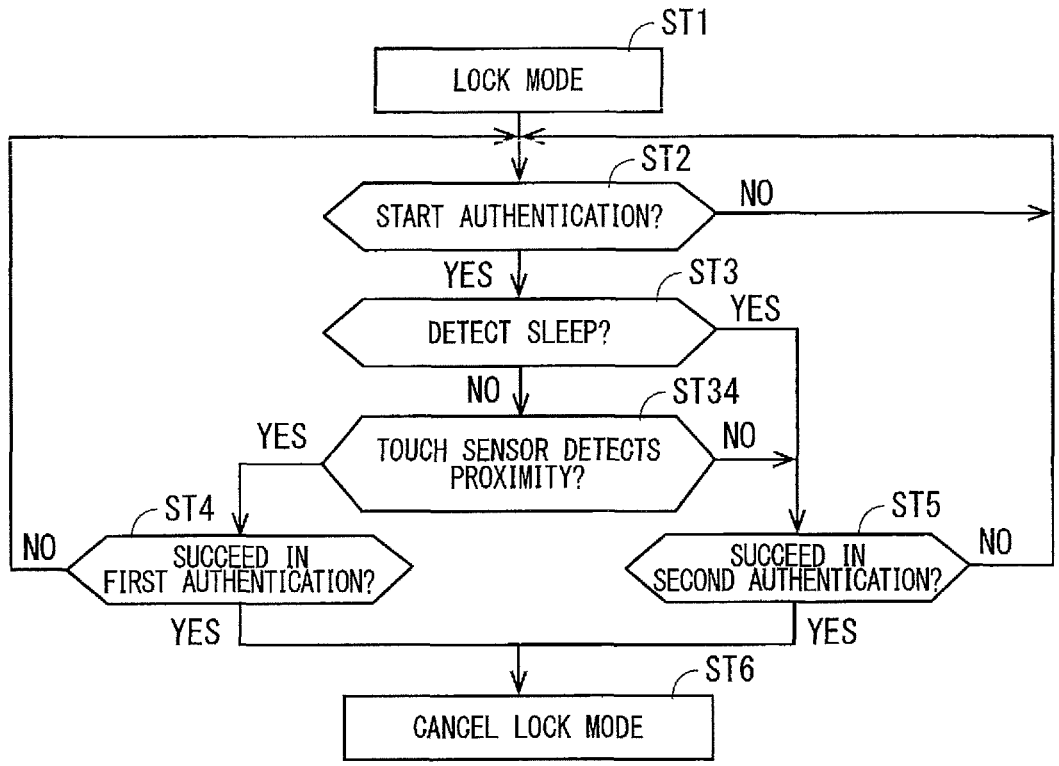
FIG. 33 illustrates a flowchart showing an example of specific operations performed by the controller.

FIG. 33 illustrates a flowchart showing an example of the operations performed by the controller 10. The operations in FIG. 33 additionally include a step ST34 with respect to FIG. 5. The step ST34 is performed if YES is selected at the step ST2. The step ST34 is performed if NO is selected at the step ST3 in the example of FIG. 33. The authenticating processor 110 determines whether the touch sensor 96 detects the proximity of a human body at the step ST34.

When the touch sensor 96 detects the proximity of a human body, the step ST4 is performed. Specifically, when sleep is not detected and the user holds the electronic apparatus 1, the first authentication is performed based on the assumption that the legitimate user is operating the electronic apparatus 1. When the authenticating processor 110 determines that the touch sensor 96 does not detect the proximity of a human body, the step ST5 is performed. Specifically, when sleep is detected or the touch sensor 96 does not detect the proximity of a human body, the second authentication is performed based on the assumption that the third party is operating the electronic apparatus 1. Thus, it is possible to further restrain the third party from illegitimately using the electronic apparatus 1.

[Face, Line of Sight, and Iris]

When the user operates the electronic apparatus 1, the face of the user is frequently located within an imaging range of the first image sensor 62 that images an object in front of the electronic apparatus 1. Conversely, when no human face is located within the imaging range of the first image sensor 62, it is highly probable that the operator is not the legitimate user but the third party.

When the image captured by the first image sensor 62 does not include any human face, the second authenticator 12 of the authenticating processor 110 may perform the second authentication.

Alternatively, when a human face is distant from the electronic apparatus 1, it is highly probable that the third party is operating the electronic apparatus 1 because the operation is different from the normal operation. When a human face is distant from the electronic apparatus 1, a proportion of the eye in the captured image is smaller and it is difficult to detect a line of sight or the iris from the image. The line of sight can be calculated from, for example, a position of the pupil in the eye. Thus, when the size of the eye in the captured image is smaller, neither the pupil nor the line of sight can be appropriately detected. Furthermore, when the size of the eye in the captured image is smaller, the iris cannot be appropriately detected. Thus, when the line of sight or the iris cannot be detected, the second authenticator 12 of the authenticating processor 110 may perform the second authentication.

With these operations, when it is highly probable that the third party is operating the electronic apparatus 1, the second authentication different from the normal first authentication can be performed.

The image sensor 60 may be a detector that detects the face, the line of sight, or the iris.

Figure 34:
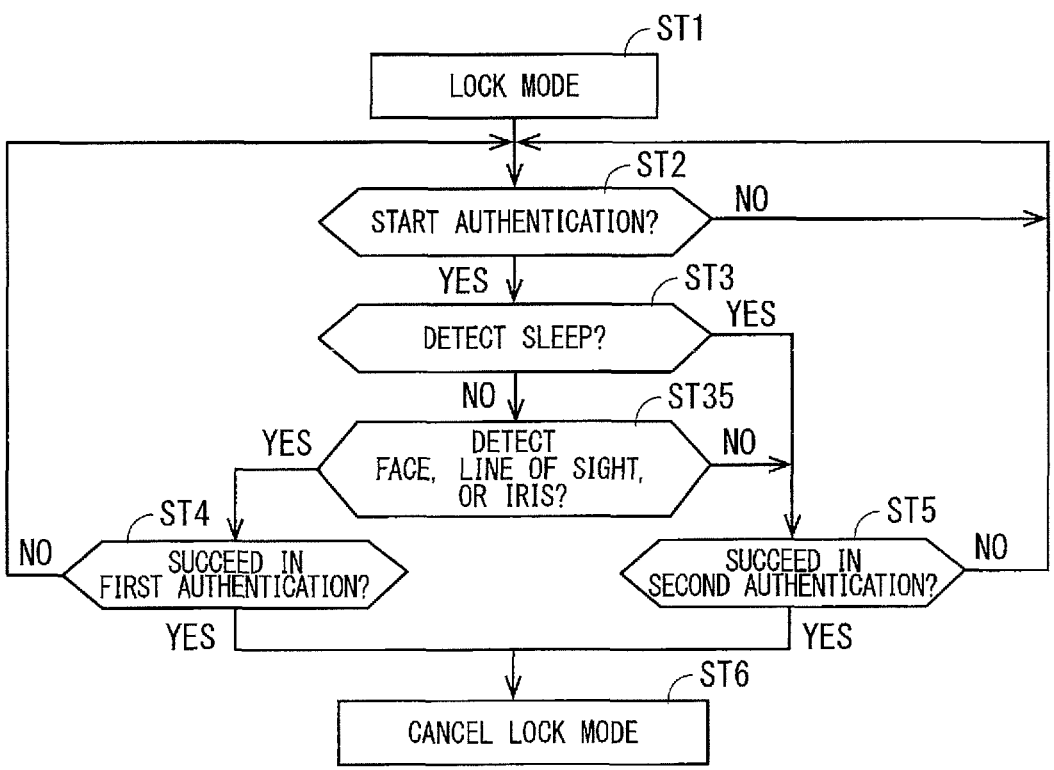
FIG. 34 illustrates a flowchart showing an example of specific operations performed by the controller.

FIG. 34 illustrates a flowchart showing an example of the operations performed by the controller 10. The operations in FIG. 34 additionally include a step ST35 with respect to FIG. 5. The step ST35 is performed if YES is selected at the step ST2. The step ST35 is performed if NO is selected at the step ST3 in the example of FIG. 34. The authenticating processor 110 determines whether the face, the line of sight, or the iris is detected from the image captured by the first image sensor 62 at the step ST35.

When the authenticating processor 110 determines that the face, the line of sight, or the iris is detected, the step ST4 is performed. Specifically, when sleep is not detected and the face, the line of sight, or the iris is detected, the first authentication is performed based on the assumption that the legitimate user is operating the electronic apparatus 1. When the authenticating processor 110 determines that the face, the line of sight, or the iris is not detected, the step ST5 is performed. Specifically, when sleep is detected or the authenticating processor 110 determines that the face, the line of sight, or the iris is not detected, the second authentication is performed based on the assumption that the third party is operating the electronic apparatus 1. Thus, it is possible to further restrain the third party from illegitimately using the electronic apparatus 1.

Embodiment 8

Figure 35:
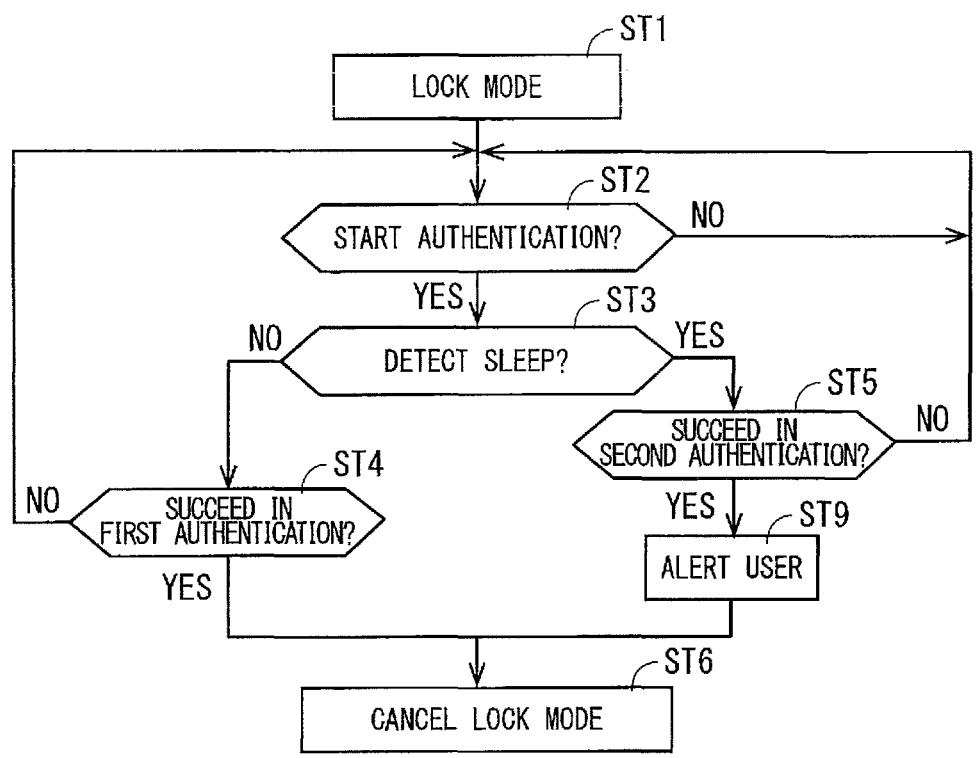
FIG. 35 illustrates a flowchart showing an example of specific operations performed by the controller.

FIG. 35 illustrates a flowchart showing an example of the operations performed by the controller 10. The operations in FIG. 35 additionally include a step ST9 with respect to FIG. 5. The step ST9 is performed if YES is selected at the step ST5. The controller 10 alerts the user at the step ST9. For example, the controller 10 causes the display 30 to display an alert or the second sound output unit 44 to make a beep. Thus, it is possible to further restrain the third party from using the electronic apparatus 1.

Although an electronic apparatus is described in detail above, the electronic apparatus is not limited by these but exemplified in all aspects. It is therefore understood that numerous modifications that have not yet been exemplified can be devised without departing from the scope of the disclosure. The disclosure is not limited to detection of sleep that is specifically described herein. The function of the sleep detectors, such as the voice input unit, the activity sensor, the brain waves sensor, and the humidity detector is not limited to detection of sleep.

Furthermore, the second user authentication that is performed when sleep is detected herein is not limited to such. The second user authentication may be used as, for example, a user authentication for conventional electronic apparatuses that do not necessarily have to detect sleep.

The embodiments can be combined with each other as long as they are not contradictory.

The invention claimed is:

1. An electronic apparatus, comprising:
   a sleep detector circuit configured to detect sleep using the circuit based on at least one electromagnetic signal indicative of at least one of: a sound from a user of the electronic apparatus, a motion status of the user; a heart rate of the user, a temperature of the user, brain waves of the user, a respiration of the user, and perspiration of the user; and at least one processor configured to perform a first user authentication when the sleep detector circuit does not detect the sleep, and perform a second user authentication when the sleep detector circuit detects the sleep, the second user authentication being different from the first user authentication, wherein:

the at least one processor determines that the first user authentication has been successful when a fingerprint detected by a fingerprint detector sensor resembles a first registered fingerprint;

the second user authentication includes a second fingerprint authentication using a second registered fingerprint different from the first registered fingerprint; and the first user authentication does not use the registered fingerprint used in the second user authentication so as to prevent access to the electronic apparatus by a third party who does not know which finger of the user corresponds to the registered fingerprint used in the second user authentication.

2. The electronic apparatus according to claim 1, further comprising a fingerprint detector sensor, wherein the first user authentication includes a first fingerprint authentication.

3. The electronic apparatus according to claim 2, wherein the at least one processor performs, in the second user authentication, a plurality of second fingerprint authentications in a predetermined order, using a plurality of registered fingerprints.

4. The electronic apparatus according to claim 1, further comprising
a display, and a touch sensor configured to detect an operation on the display, wherein the second user authentication includes a password authentication, and in the second user authentication, the at least one processor moves an element with passage of time, and concurrently causes the display to display the element, the element functioning as a button for entering a password.

5. The electronic apparatus according to claim 1, further comprising:
a display, and a touch sensor configured to detect an operation on the display, wherein the second user authentication includes a password authentication, the at least one processor causes the display to display an element functioning as a button for entering a password, and the element is operated by an operation other than tapping the display.

6. The electronic apparatus according to claim 5, wherein the operation includes sliding from the element to a predetermined position.

7. The electronic apparatus according to claim 1, further comprising;
a display, and a touch sensor configured to detect an operation on the display, wherein each of the first and second user authentications includes a password authentication, the at least one processor causes the display to display an element functioning as a button for entering a password in each of the first and second user authentications, and the element in the second user authentication is smaller than the element in the first user authentication.

8. The electronic apparatus according to claim 1, further comprising;
an image sensor, wherein the second user authentication includes a password authentication, and in the second user authentication, the at least one processor analyzes an image captured by the image sensor, and when the captured image includes text, determines that the text has been entered as a component of a password.

9. The electronic apparatus according to claim 1, wherein the second user authentication includes biometrics.

10. The electronic apparatus according to claim 1, further comprising;
an image sensor configured to image an object in front of the electronic apparatus when the at least one processor performs the second user authentication.

11. The electronic apparatus according to claim 1, further comprising;
a display, a simulated error display, and a time-measuring circuit, wherein the simulated error display causes the display to display a simulated error screen indicating unavailability of the electronic apparatus when the at least one processor starts the second user authentication, and the at least one processor receives an input for the second user authentication after a lapse of a predetermined time since the simulated error screen is displayed.

12. The electronic apparatus according to claim 1, further comprising;
a display, wherein the at least one processor restricts information to be displayed on the display when the second user authentication has been successful, the information being generated or changed by a user.

13. The electronic apparatus according to claim 1, further comprising;
an acceleration detector sensor, wherein the at least one processor performs the second user authentication when a variation in acceleration measured by the acceleration detector sensor is smaller than a reference value over a predetermined time period.

14. The electronic apparatus according to claim 1, further comprising;
an inclination detector circuit configured to measure an inclination angle of the electronic apparatus, wherein the at least one processor performs the second user authentication when the inclination angle falls out of a predetermined inclination range.

15. The electronic apparatus according to claim 1, further comprising;
a time obtaining circuit configured to obtain a current time, wherein the at least one processor performs the second user authentication when the current time is outside a predetermined time period.

16. The electronic apparatus according to claim 1, further comprising;
a touch sensor located at a side portion or a rear portion of the electronic apparatus, the touch sensor configured to detect proximity of a human body, wherein the at least one processor performs the second user authentication when the touch sensor does not detect the proximity.

17. The electronic apparatus according to claim 1, further comprising;
a detector circuit configured to detect a face, a line of sight, or an iris, wherein the at least one processor performs the second user authentication when the detector circuit does not detect the face, the line of sight, or the iris.

18. A method for authenticating an electronic apparatus, the method comprising:
determining whether sleep of a user of the electronic apparatus is detected using a sleep detection circuit contained in the electronic apparatus, wherein sleep is detected by the sleep detection circuit based on at least one electromagnetic signal indicative of at least one of: a sound from a user of the electronic apparatus, a motion status of the user; a heart rate of the user, a temperature of the user, brain waves of the user, a respiration of the user, and perspiration of the user; and performing a first user authentication when the sleep is not detected, and performing a second user authentication when the sleep is detected, the second user authentication being different from the first user authentication, wherein:

the first user authentication is determined to be successful when a fingerprint detected by a fingerprint detector sensor resembles a first registered fingerprint;

the second user authentication includes a second fingerprint authentication using a second registered fingerprint different from the first registered fingerprint; and the first user authentication does not use the registered fingerprint used in the second user authentication so as to prevent access to the electronic apparatus by a third party who does not know which finger of the user corresponds to the registered fingerprint used in the second user authentication.

19. A non-transitory computer readable recording medium in which a control program is stored, the control program causing the electronic apparatus to execute the steps of:

determining whether sleep of a user of the electronic apparatus is detected using a sleep detection circuit contained in the electronic apparatus, wherein sleep is detected by the sleep detection circuit based on at least one electromagnetic signal indicative of at least one of: a sound from a user of the electronic apparatus, a motion status of the user; a heart rate of the user, a temperature of the user, brain waves of the user, a respiration of the user, and perspiration of the user; and performing a first user authentication when the sleep is not detected, and performing a second user authentication when the sleep is detected, the second user authentication being different from the first user authentication, wherein:

the first user authentication is determined to be successful when a fingerprint detected by a fingerprint detector sensor resembles a first registered fingerprint;

the second user authentication includes a second fingerprint authentication using a second registered fingerprint different from the first registered fingerprint; and the first user authentication does not use the registered fingerprint used in the second user authentication so as to prevent access to the electronic apparatus by a third party who does not know which finger of the user corresponds to the registered fingerprint used in the second user authentication.

* * * * *